United States Patent
Wakasa

(10) Patent No.: US 7,773,817 B2
(45) Date of Patent: Aug. 10, 2010

(54) JPEG IMAGE PROCESSING CIRCUIT

(75) Inventor: Shinji Wakasa, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 909 days.

(21) Appl. No.: 11/637,696

(22) Filed: Dec. 13, 2006

(65) Prior Publication Data

US 2008/0044090 A1  Feb. 21, 2008

(30) Foreign Application Priority Data

Aug. 15, 2006  (JP) ............................. 2006-221576

(51) Int. Cl.
  G06K 9/36  (2006.01)
  G06K 9/46  (2006.01)
(52) U.S. Cl. ..................... 382/234; 382/304
(58) Field of Classification Search ................. 382/234, 382/248, 302, 303, 304, 307
  See application file for complete search history.

(56) References Cited

U.S. PATENT DOCUMENTS 5,379,070 A * 1/1995 Retter et al. ............. 375/240.2
5,764,801 A * 6/1998 Munemasa et al. .......... 382/234
6,563,535 B1 * 5/2003 Anderson ................ 348/231.2
7,266,254 B2 * 9/2007 Ishikawa et al. ............ 382/305

FOREIGN PATENT DOCUMENTS

JP  10-304356 A   11/1998
JP  2001-005552 A  1/2001

* cited by examiner

*Primary Examiner*—Phuoc Tran
(74) *Attorney, Agent, or Firm*—Arent Fox LLP

(57) ABSTRACT

A JPEG image processing circuit, capable of performing a JPEG process at high speed, and with low power consumption, and of automatically recovering from a slight trouble, has been disclosed. In the JPEG processing circuit, a JPEG processing section is configured so as to comprise a plurality of JPEG processing cores and a plurality of data storage regions provided in correspondence with the plurality of JPEG processing cores, and when each of the JPEG processing cores performs the process in parallel, the unprocessed data required for the process of each of the JPEG processing cores is stored in each of the data storage regions, corresponding to each of the JPEG processing cores, via a common bus connected to an image memory.

13 Claims, 41 Drawing Sheets

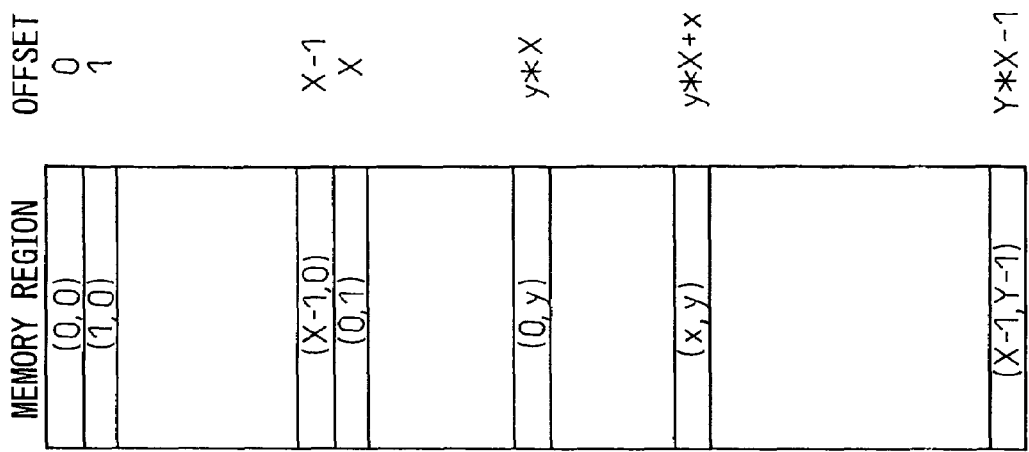
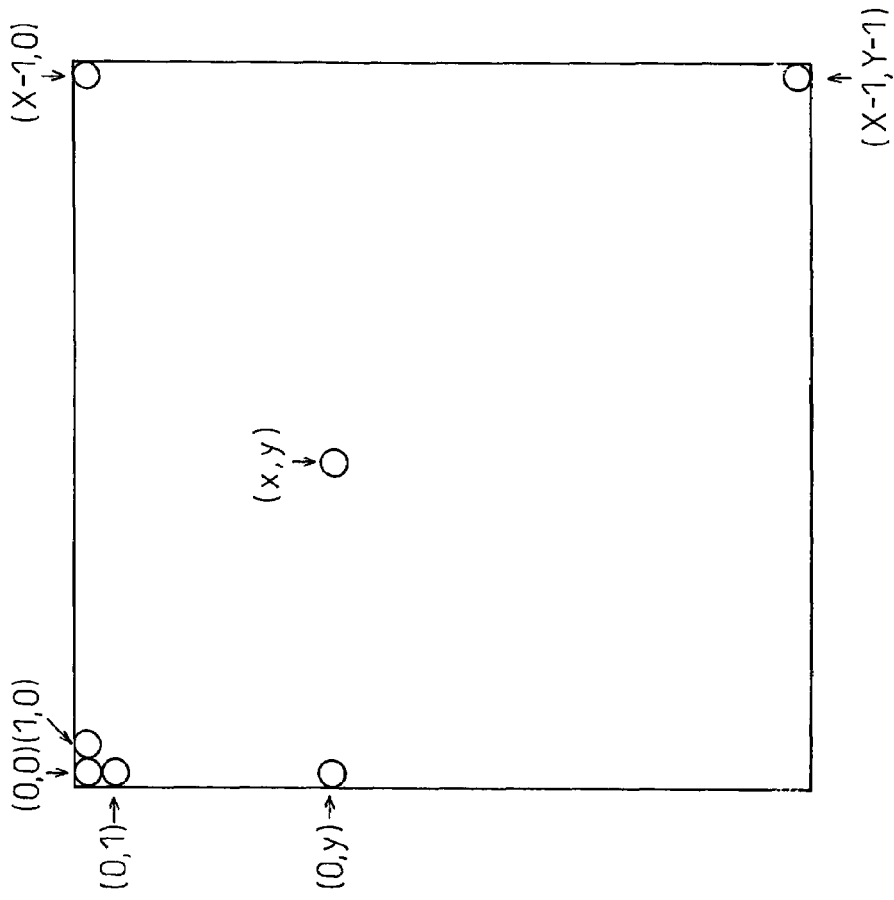

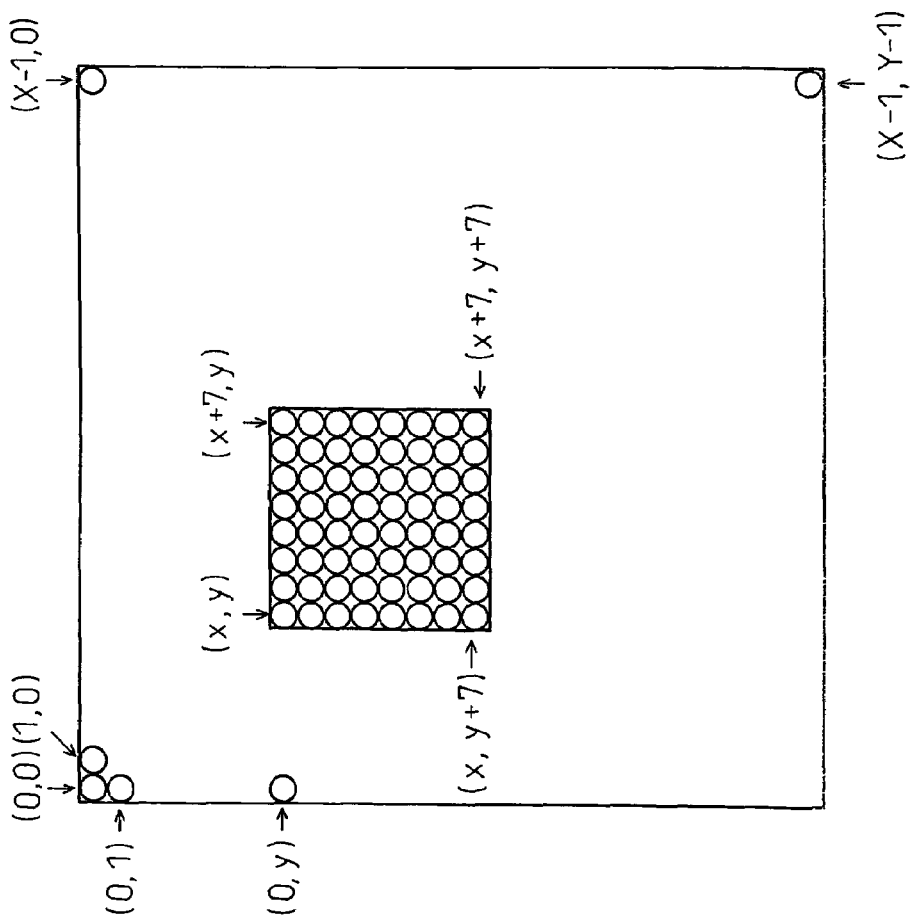
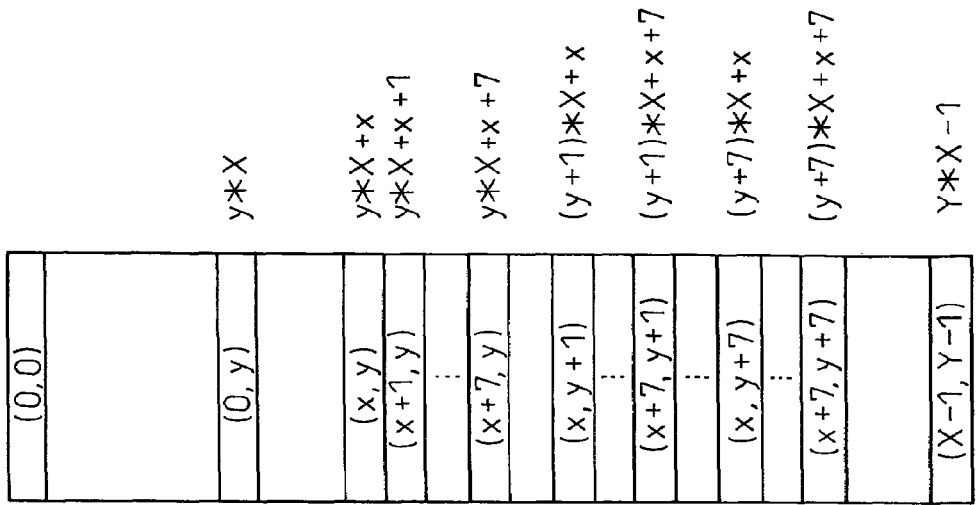
FIG.5A
FIG.5B

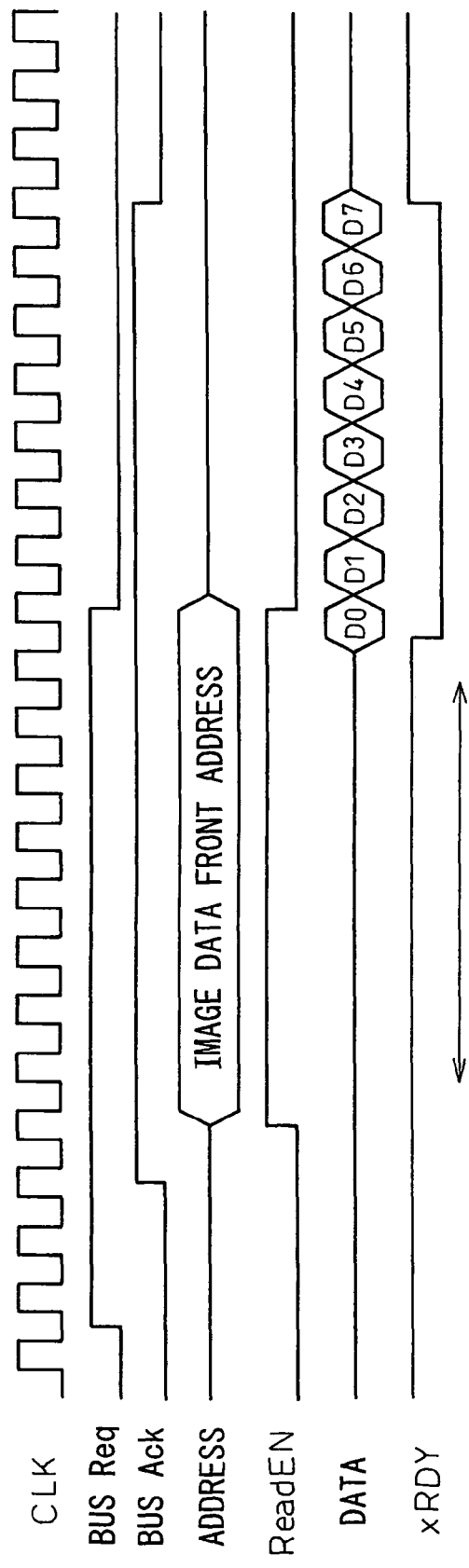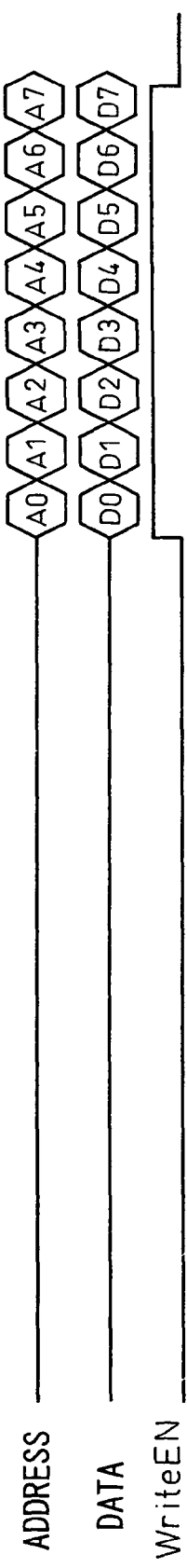

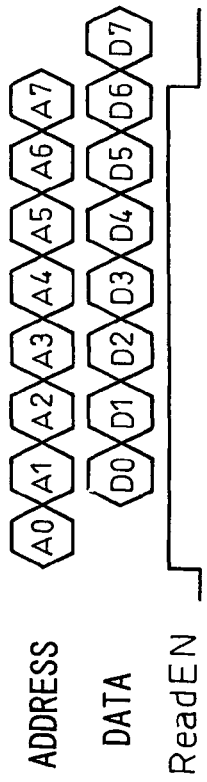
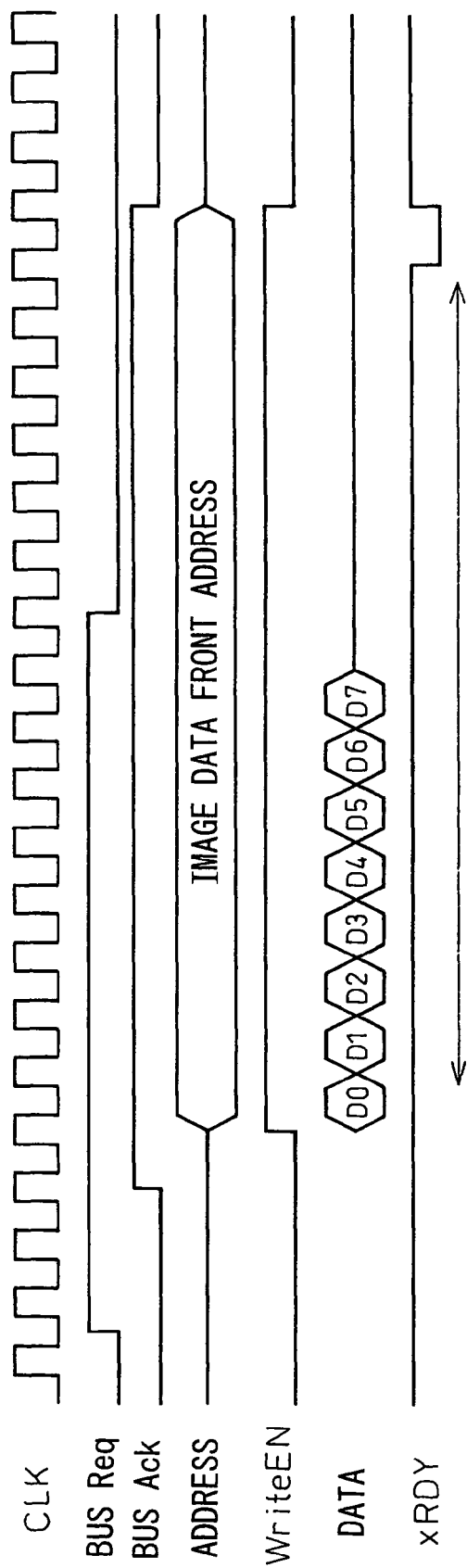
FIG.21A
FIG.21B

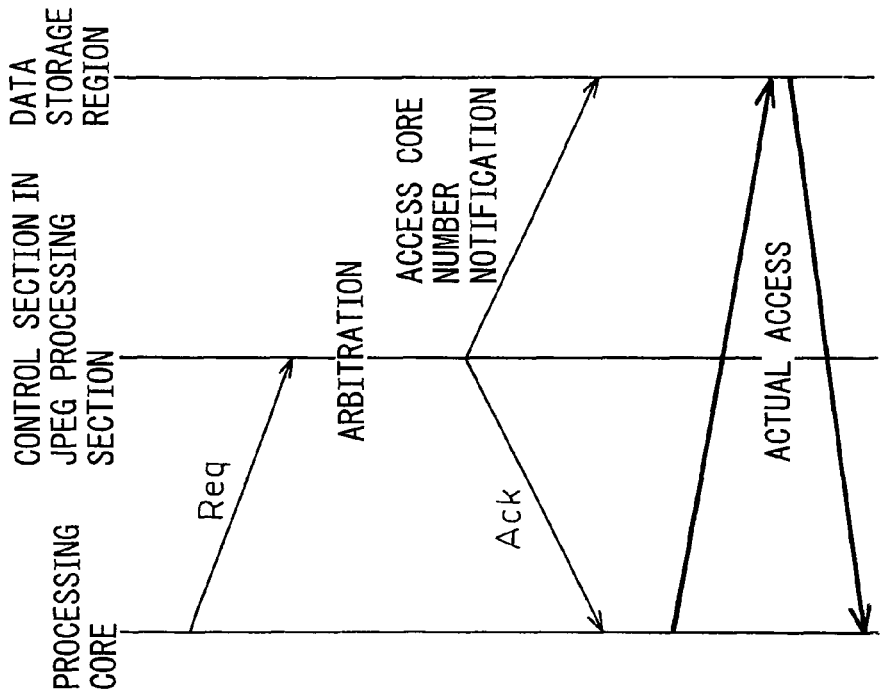
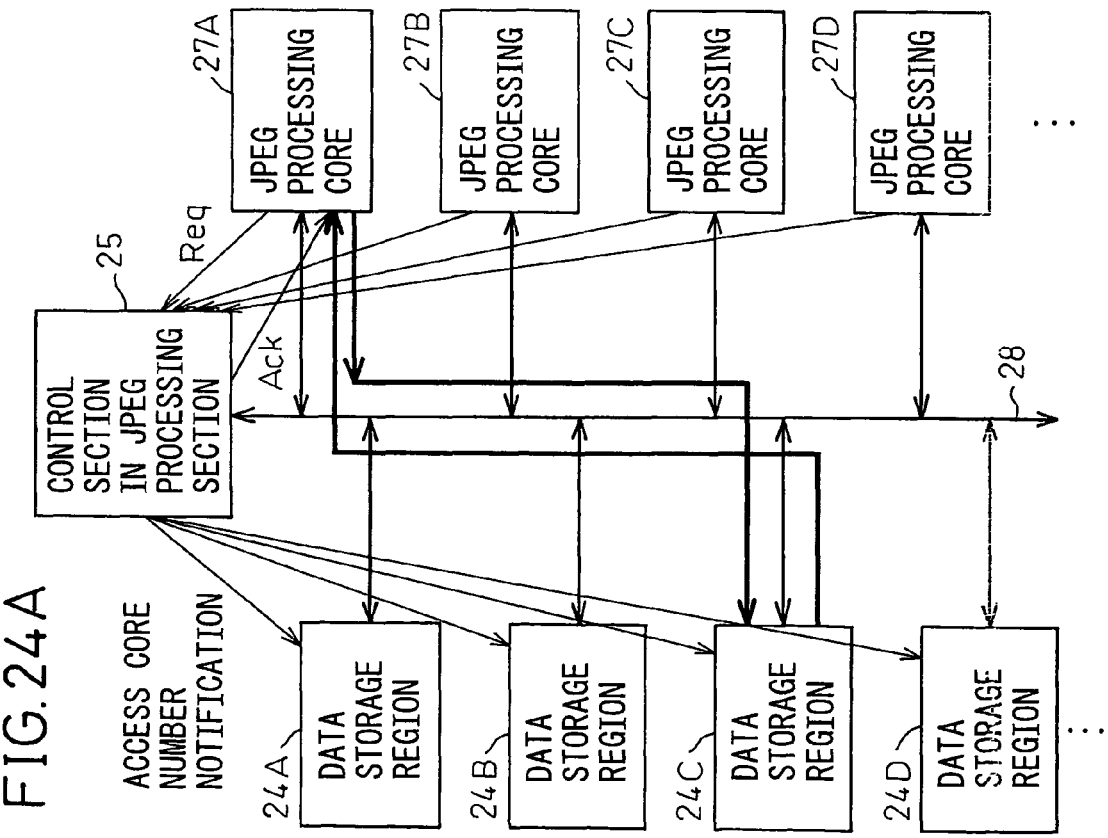

FIG. 28A

| DESTINATION ADDRESS | SOURCE ADDRESS | COMMAND | TRAILER |

FIG. 28B

| DESTINATION ADDRESS | SOURCE ADDRESS | COMMAND | DATA | TRAILER |

FIG. 28C

| SOURCE ADDRESS | DESTINATION ADDRESS | ACKNOWLEDGE | TRAILER |

FIG. 28D

| SOURCE ADDRESS | DESTINATION ADDRESS | COMMAND | DATA | TRAILER |

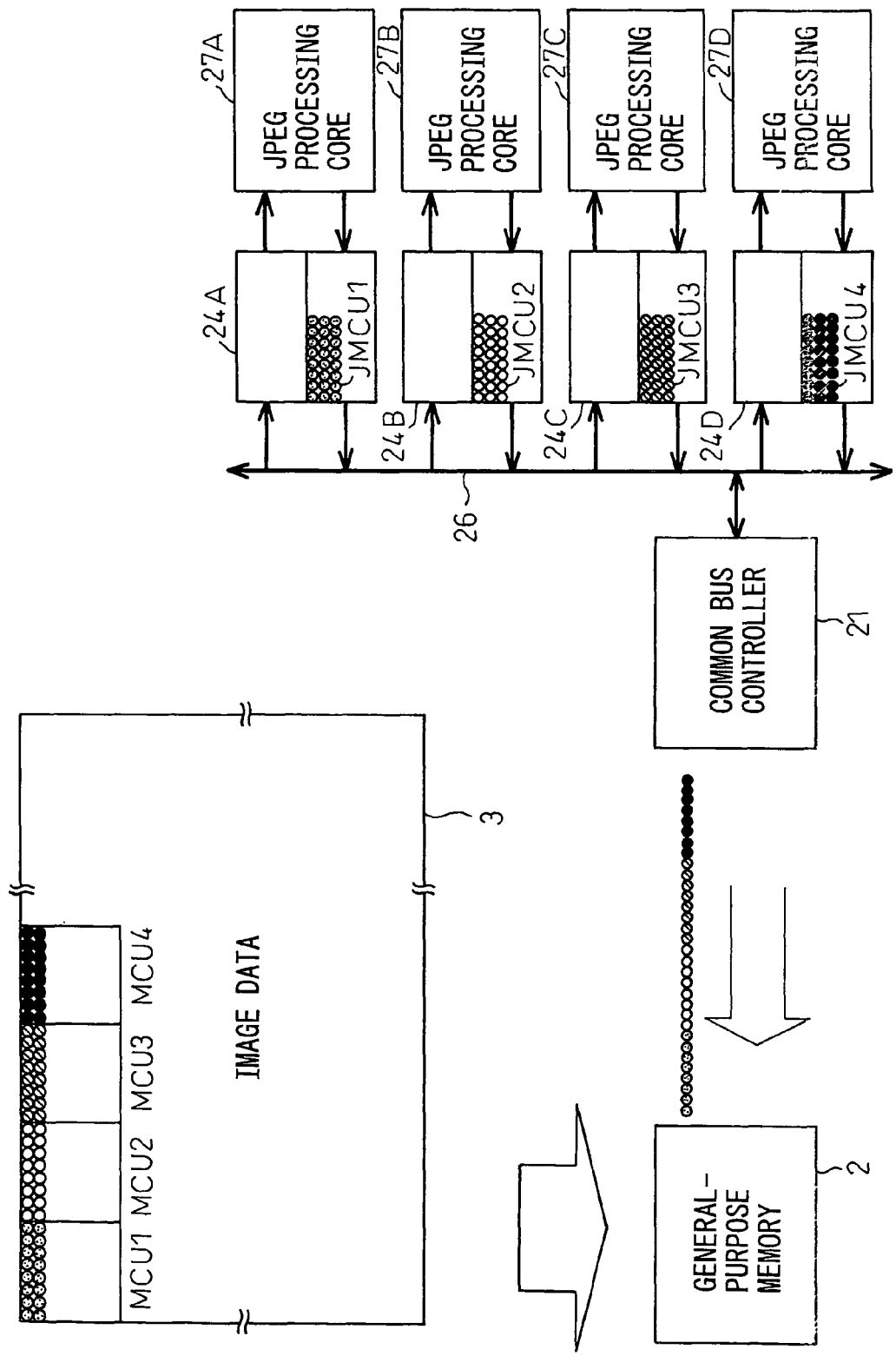

FIG.31

| OPERATION MODE REGISTER |
| --- |
| COMMAND REGISTER |
| OPERATION STATE DISPLAY REGISTER |
| IMAGE LONGITUDINAL SIZE VALUE REGISTER |
| IMAGE TRANSVERSE SIZE VALUE REGISTER |
| INTERRUPT SETTING REGISTER |
| INTERRUPT STATE REGISTER |
| INTERRUPT MASK REGISTER |
| ERROR STATE DISPLAY REGISTER |
| JPEG DATA BUFFER START ADDRESS |
| IMAGE DATA Y COMPONENT BUFFER START ADDRESS |
| IMAGE DATA Cb COMPONENT BUFFER START ADDRESS |
| IMAGE DATA Cr COMPONENT BUFFER START ADDRESS |
| JPEG SIZE REGISTER |
| TROUBLE MONITOR TIMER REGISTER |
| IN-TROUBLE ACTION REGISTER |

| 7 | | 0 |
|---|---|---|
| | ASSIGNED NUMBER OF CORES | |
| | ASSIGNED NUMBER OF DATA STORAGE REGIONS | |

| 7 | | | | 0 |
|---|---|---|---|---|
| decode B | decode A | encode B | encode A | |
| | | | NOT ASSIGNED | |

"00" : STOP
"01" : FREQUENCY PATTERN 0
"10" : FREQUENCY PATTERN 1
"11" : FREQUENCY PATTERN 2

| 7 | | 0 |
|---|---|---|
| STATE DISPLAY OF EACH CORE, CORES 0-3 | | |
| STATE DISPLAY OF EACH CORE, CORES 4-7 | | |
| STATE DISPLAY OF EACH CORE, CORES 8-11 | | |
| STATE DISPLAY OF EACH CORE, CORES 12-15 | | |

"00" : NOP
"01" : DURING RESETTING/IN TROUBLE
"10" : encode ASSIGNED
"11" : decode ASSIGNED

FIG.35

| 7 | 0 |
|---|---|
| IMAGE LONGITUDINAL SIZE REGISTER (upper) | |
| IMAGE LONGITUDINAL SIZE REGISTER (lower) | |
| IMAGE TRANSVERSE SIZE REGISTER (upper) | |
| IMAGE TRANSVERSE SIZE REGISTER (lower) | |

FIG.36A

| 7 | | 0 |
|---|---|---|
| | ENDING INTERRUPT STATE | |
| | ABNORMAL INTERRUPT STATE | |

FIG.36B

| 7 | | 0 |
|---|---|---|
| | ENDING INTERRUPT MASK | |
| | ABNORMAL INTERRUPT MASK | |

FIG.37A

| 7 | | 0 |
|---|---|---|
| ERROR INTERRUPT FACTOR DETAIL 0 | | |
| ERROR INTERRUPT FACTOR DETAIL 1 | | |
| ERROR INTERRUPT FACTOR DETAIL 2 | | |
| ERROR INTERRUPT FACTOR DETAIL 3 | | |

FIG.37B

| 7 | | 0 |
|---|---|---|
| ERROR INTERRUPT FACTOR DETAIL MASK 0 | | |
| ERROR INTERRUPT FACTOR DETAIL MASK 1 | | |
| ERROR INTERRUPT FACTOR DETAIL MASK 2 | | |
| ERROR INTERRUPT FACTOR DETAIL MASK 3 | | |

FIG.39

| 7 | | 0 |
|---|---|---|
| JPEG DATA SIZE (upper) | | |
| JPEG DATA SIZE (middle upper) | | |
| JPEG DATA SIZE (middle lower) | | |
| JPEG DATA SIZE (lower) | | |

FIG.40A

| 7 | | 0 |
|---|---|---|
| TROUBLE MONITOR TIMER (upper) | | |
| TROUBLE MONITOR TIMER (middle upper) | | |
| TROUBLE MONITOR TIMER (middle lower) | | |
| TROUBLE MONITOR TIMER (lower) | | |

FIG.40B

OCCURRENCE

| 7 | | 0 |
|---|---|---|
| | | CORE NUMBER |

"000" : NOTHING IS DONE
"001" : AUTOMATIC ASSIGNMENT OF CORES NOT IN USE
"010" : AUTOMATIC RESUMPTION
         (SELF reset:UP TO NUMBER OF TIMES OF
          RESUMPTION THRESHOLD VALUES           )
"011" : SEPARATION OF TROUBLE
"100" : COMPLETELY STOP OF ENTIRE OPERATION

JPEG IMAGE PROCESSING CIRCUIT

BACKGROUND OF THE INVENTION

The present invention relates to a JPEG image processing circuit for encoding/decoding the JPEG format (JPEG Encoding/Decoding), which is a standard format for still images and, more particularly, to a JPEG image processing circuit having a plurality of JPEG processing cores and performing processes in parallel.

A digital camera is a typical example of a system that handles the JPEG format (a JPEG image processing circuit). A digital camera is explained below as an example, however, the present invention is not limited to this, but can be applied to any JPEG image processing circuit that handles the JPEG format. In a digital camera, besides the JPEG conversion processes, actual image data is captured and the data is stored in a common memory or a storage device. Further, moving images or still images are displayed on a display unit of a system (in general, an LCD device), data is output to an external output terminal, or reversely, data is input from an external input terminal.

As these images are input/output in formats conforming various standards, the process of handling these images must be done in real time. Because of this, the JPEG encoding/decoding process, which is performed independently of the process which must be done in real time, is not strictly required to be done in real time although the performance itself is one of the factors of the system. Therefore, in many cases, a product to be put on a market where priority is given to low-cost, such as a consumer market, employs a configuration in which a common memory or a storage device for storing data and a plurality of functional modules are connected by a single common bus and the common bus is assigned to the plurality of functional modules in a time-shared manner and the functional module to which the common bus has been assigned accesses the common memory and the storage device.

Patent document 1: Japanese Unexamined Patent Publication (Kokai) No. 10-304356

Patent document 2: Japanese Unexamined Patent Publication (Kokai) No. 2001-005552

SUMMARY OF THE INVENTION

In actuality, however, a bandwidth large enough for all of the modules to operate at the same time is not provided to the common bus but only a minimum bandwidth is provided.

Further, on the above-mentioned common bus, the priority of the JPEG processing section, for which the real-time property is less required, is low and there was a trend for the actual execution time of the JPEG encoding/decoding process to depend on the number of functional modules simultaneously in operation etc.

For the system, not only performance but also low power consumption is a challenge and it may happen frequently that the relative importance changes between performance and power consumption depending on the use conditions and system specifications.

It is a well-known fact that one of the solutions to the improvement of performance is to increase the operating frequency, however, an increase in the operating frequency leads to an extreme increase in power consumption depending on the rate of increase, and in an LSI to which the current state-of-the-art techniques have been applied, it is possible that trouble may occur due to heat and the degree of integration and, therefore, an automatic recovery process is required so far as this will not bring about a problem, relating to the system, in a built-in system.

A first object of the present invention is to realize a JPEG image processing circuit capable of performing a JPEG process at high speed.

A second object of the present invention is to reduce power consumption in a JPEG processing circuit.

A third object of the present invention is to realize an image processing circuit capable of automatically recovering from trouble.

In order to realize the above-mentioned first object, in a JPEG processing circuit of the present invention, a JPEG processing section is configured so as to comprise a plurality of JPEG processing cores and a plurality of data storage regions provided in correspondence to the plurality of JPEG processing cores and when the JPEG processing cores perform processes in parallel, unprocessed data necessary for each of the JPEG processing cores is stored in each of the data storage regions corresponding to each of the JPEG processing cores via a common bus connected to an image memory.

In the JPEG processing circuit of the present invention, when the plurality of JPEG processing cores perform JPEG processes in parallel, the unprocessed data necessary for the process is stored in the data storage region provided in correspondence with each of the JPEG processing cores and, therefore, it is possible for the JPEG processing core to perform the process at high speed even if the priority for the bus occupation is low because it is not necessary to access the image memory via the common bus. Due to this, it is possible to improve the JPEG processing speed.

By the way, it is also desirable for the data processed by each of the JPEG processing cores to be output to the image memory via the common bus after being stored in the corresponding data storage region. It is desirable for transmission of data between the image memory and the plurality of data storage regions to be performed at high speed by means of, for example, a burst mode etc. Due to this, it is possible to reduce the bus use time and improve the total processing speed.

It is desirable for the amount of unprocessed data stored in each of the data storage regions to be the minimum encoding unit (MCU) of the JPEG process. Due to this, a more efficient JPEG process can be realized. This is not a limitation, however, and it may also be possible for the amount of unprocessed data stored in each of the data storage regions to be dynamically variable. Due to this, an efficient process in accordance with process contents and circumstances can be realized.

In order to realize the above-mentioned second object, it is desirable for the control section of the JPEG processing section to be capable of dynamically varying the number of JPEG processing cores in the operating state among the plurality of the JPEG processing cores.

According to the present invention, when the required processing speed is low, it is possible to reduce power consumption by reducing the number of JPEG processing cores to be operated, that is, to which the clock is supplied.

Further, in order to realize the above-mentioned second object, the JPEG processing section comprises an operation clock control section that sets the operation clock frequency of each of the JPEG processing cores in accordance with the operation.

According to the present invention, when the required processing speed is low, it is possible to reduce power consumption by reducing the operation speed of the JPEG processing core, that is, the clock frequency to be supplied to the JPEG processing core.

Further, in order to realize the above-mentioned third object, the control section of the JPEG processing section automatically detects the occurrence of trouble in the plurality of the JPEG processing cores and when the trouble is slight, performs a recovery process, based on trouble information and in accordance with an action plan set in advance, and makes an attempt to avoid a process error. Examples of the action plan include a plan in which the process in the JPEG processing core in which the trouble has occurred is assigned to another JPEG processing core to continue the process, or the like.

The occurrence of trouble is detected by the control section, which monitors the processing time in each of the JPEG processing cores and judges a time-out of the processing time that exceeds the reference time. The time-out judgment is made by detecting the elapsed time with an absolute-time timer after the start of the process in the JPEG processing core and by comparing the elapsed time with the reference time.

According to the present invention, it is possible to perform a JPEG process at high speed and with low power consumption and a JPEG image processing circuit capable of automatically recovering from slight trouble can be realized.

BRIEF DESCRIPTION OF THE DRAWINGS

The features and advantages of the invention will be more clearly understood from the following description taken in conjunction with the accompanying drawings, in which:

FIG. 3A and FIG. 3B are diagrams showing a relationship between coordinates of points on a screen and addresses in a memory.

FIG. 5A and FIG. 5B are diagrams for explaining a basic unit of the JPEG process.

FIG. 20A and FIG. 20B are time charts of data transmission from a general-purpose memory to a data storage region.

FIG. 21A and FIG. 21B are time charts of data transmission from a data storage region to a general-purpose memory.

FIG. 24A and FIG. 24B are diagrams for explaining an access system by a request/acknowledgment system.

FIGS. 28A to 28D are diagrams showing a command example in a switch/matrix system.

FIG. 30 is a diagram for explaining data transmission from a data storage region to a general-purpose memory during the period of JPEG decoding process.

FIG. 31 is a diagram showing a configuration of a JPEG control register.

FIG. 35 is a diagram showing a configuration of an image longitudinal/transverse size register.

FIG. 36A and FIG. 36B are diagrams showing an interrupt state/mask register.

FIG. 37A and FIG. 37B are diagrams showing a configuration of an error interrupt state detail/mask register.

FIG. 39 is a diagram showing a configuration of a JPEG data size register.

FIG. 40A and FIG. 40B are diagrams showing a configuration of a trouble monitor timer/core number notification register.

DESCRIPTION OF THE PREFERRED EMBODIMENTS

Figure 1:
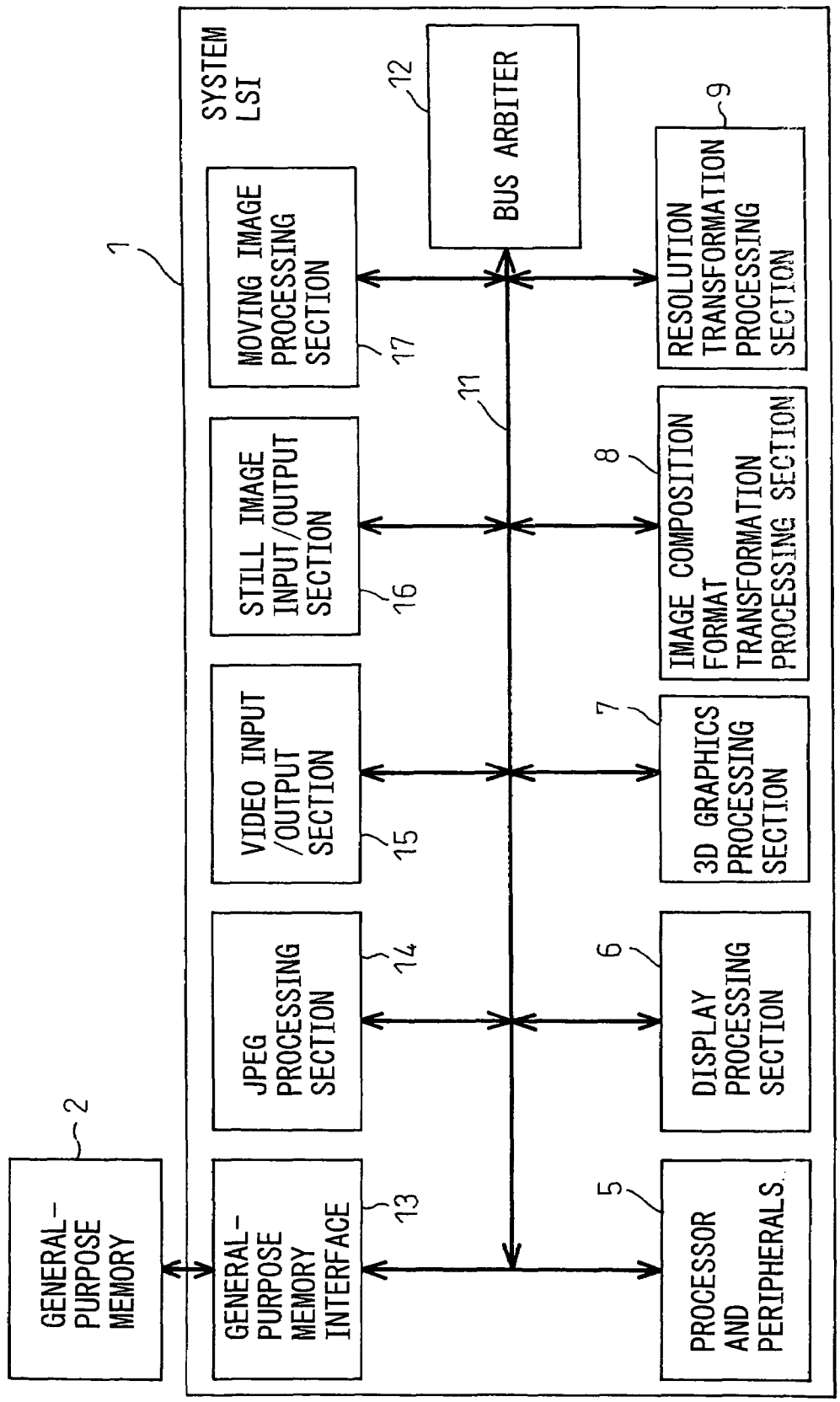
FIG. 1 is a general block diagram of a system LSI including a JPEG processing section in an embodiment.

FIG. 1 is a block diagram showing a general configuration of a system LSI 1 constituting a JPEG processing circuit in an embodiment of the present invention. The system LSI 1 has a common bus 11, a bus arbiter 12, a general-purpose memory interface 13, a JPEG processing section 14, a video input/output section 15, a still image input/output section 16, a moving image input/output section 17, a processor and peripheral circuit section 5, a display processing section 6, a three-dimensional (3D) graphics processing section 7, an image composition format transformation processing section 8, and a resolution transformation processing section 9. The configuration of the system LSI 1 is well known conventionally, however, the configuration of the JPEG processing section 14 in the present embodiment is different from that in the conventional example. Therefore, the explanation of the sections other than the JPEG processing section 14 is omitted.

To the LSI 1, a general-purpose memory 2 constituted by an SDRAM etc. is connected via the general-purpose memory interface 13. In the general-purpose memory 2, various pieces of data including YCbCr image data and JPEG image data are stored. Incidentally, although not shown schematically here, to the video input/output section 15, a display unit (display) such as an LCD device or a video camera is connected, and to the still image input/output section 16, a digital camera is connected.

With the conventional LSI, when the need to access the image memory (general-purpose memory) 2 associated with a process occurred, the JPEG processing section 14 accessed the image memory 2 via the common bus 11 and the general-purpose memory interface 13 each time. Because of this, a request for the occupation right of the common bus 11 was made, frequently, to the bus arbiter 12. However, the common bus 11 was shared with other components for performing processes with high priority, therefore, a standby time, until the assignment of the common bus 11, was lengthened and there used to be a problem of a long time required for the JPEG process.

Figure 2:
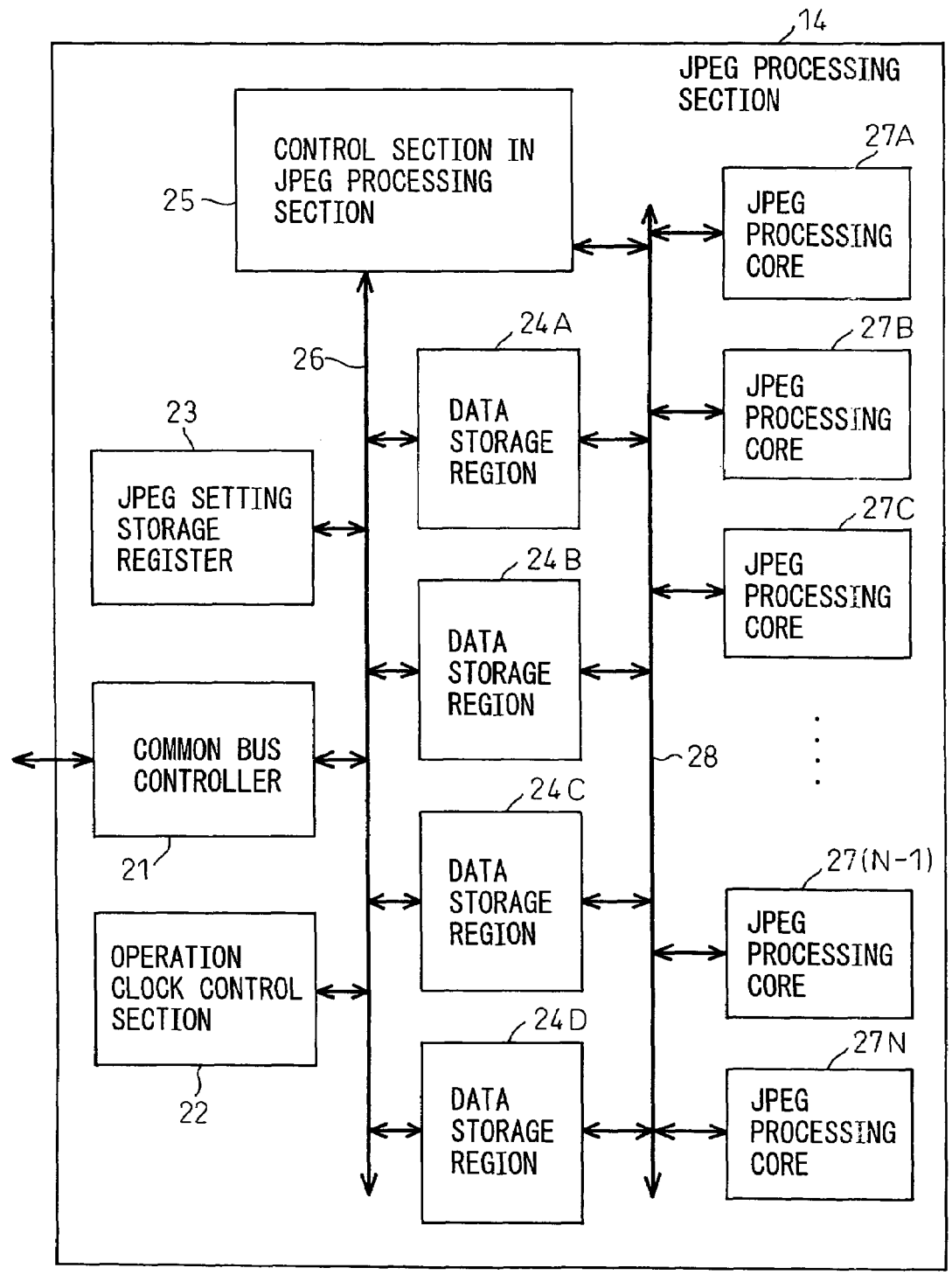
FIG. 2 is a block diagram of a JPEG processing section in an embodiment.

In the present embodiment, the JPEG processing section 14 is configured as shown in FIG. 2. As shown in FIG. 2, the JPEG processing section 14 in the present embodiment has a common bus controller 21 for controlling the connection with the common bus 11, an operation clock control section 22, a JPEG setting storage register 23, a plurality of data storage regions 24A to 24D, a control section in JPEG processing section 25, a first internal bus 26 for connecting the above-mentioned components, a plurality of JPEG processing cores 27A to 27D, and a second internal bus 28 for connecting the plurality of JPEG processing cores 27A to 27D, the plurality of data storage regions 24A to 24D, and the control section in JPEG processing-section 25. By the way, in FIG. 2, an example is shown in which four data storage regions 24A to 24D are included, however, the number of regions is not limited. Further, as shown in FIG. 2, the four data storage regions 24A to 24D are configured so as to be capable of being accessed by both the first internal bus 26 and the second internal bus 28, and are realized by, for example, a dual port memory, a FIFO memory, etc.

Further, the four JPEG processing cores 27A to 27D and the four data storage regions 24A to 24D are connected by the second internal bus 28 and each JPEG processing core is capable of accessing any of the data storage regions. The control section in JPEG processing section 25 controls the bus, such as the occupation right of the internal bus 28 etc.

In the present embodiment, due to the above configuration, the JPEG encoding/decoding process is improved in rate by the efficient data inputting/outputting to/from the data storage regions in accordance with the JPEG process contents and the parallel processing by the plurality of JPEG processing cores 27A to 27D. Further, by the operation clock control of the plurality of JPEG processing cores 27A to 27D, the power consumption is reduced. Furthermore, due to the monitoring function of the control section in JPEG processing section 25, the state of the plurality of JPEG processing cores 27A to 27D executing the JPEG process is grasped and, in the case of a slight trouble, automatic recovery from the trouble is performed by the recovery process.

Before the detailed explanation of the present embodiment is given, a method for storing image data and data transmission by an SDRAM used as a memory in the present embodiment are explained briefly.

FIG. 3A is a diagram showing coordinates of points on a screen in a system that handles general images and FIG. 3B is a diagram showing addresses when the data of the coordinates is stored on a memory. As shown in FIG. 3A, an image consisting of transverse X dots and longitudinal Y dots starts from the coordinates (0, 0) and is constituted by X×Y dots up to the coordinates (X−1, Y−1).

An example in which the data of points on the image is expanded on the memory region is shown in FIG. 3B. On the memory region, the data of a dot with the coordinates (0, 0) is stored at the location of the address of offset 0 and the data of a dot with the coordinates (1, 0) is stored at the address of 1. Here, it is assumed that the meaning of the number of an address is that the amount of data indicating each dot and the amount of data that can be stored at each address on the memory region are equal, or the amount of data on the memory region is larger.

As shown schematically, in the memory region, the data of the dots having the same Y coordinate is stored continuously with respect to the value of the X coordinate and, when the X coordinate reaches X−1, the Y coordinate is incremented by 1 and, after this, the data up to the coordinates (X−1, Y−1) is stored sequentially in the same manner. For example, the data of a dot having the coordinates (x, y) on the screen is stored at the address of offset y×X+x (y*X+x) on the memory region.

In other words, if the size of length and width of an image and the offset location on the memory region at which the data of the image is stored are known, where the data of each coordinate is stored on the memory region can be known uniquely.

Figure 4:
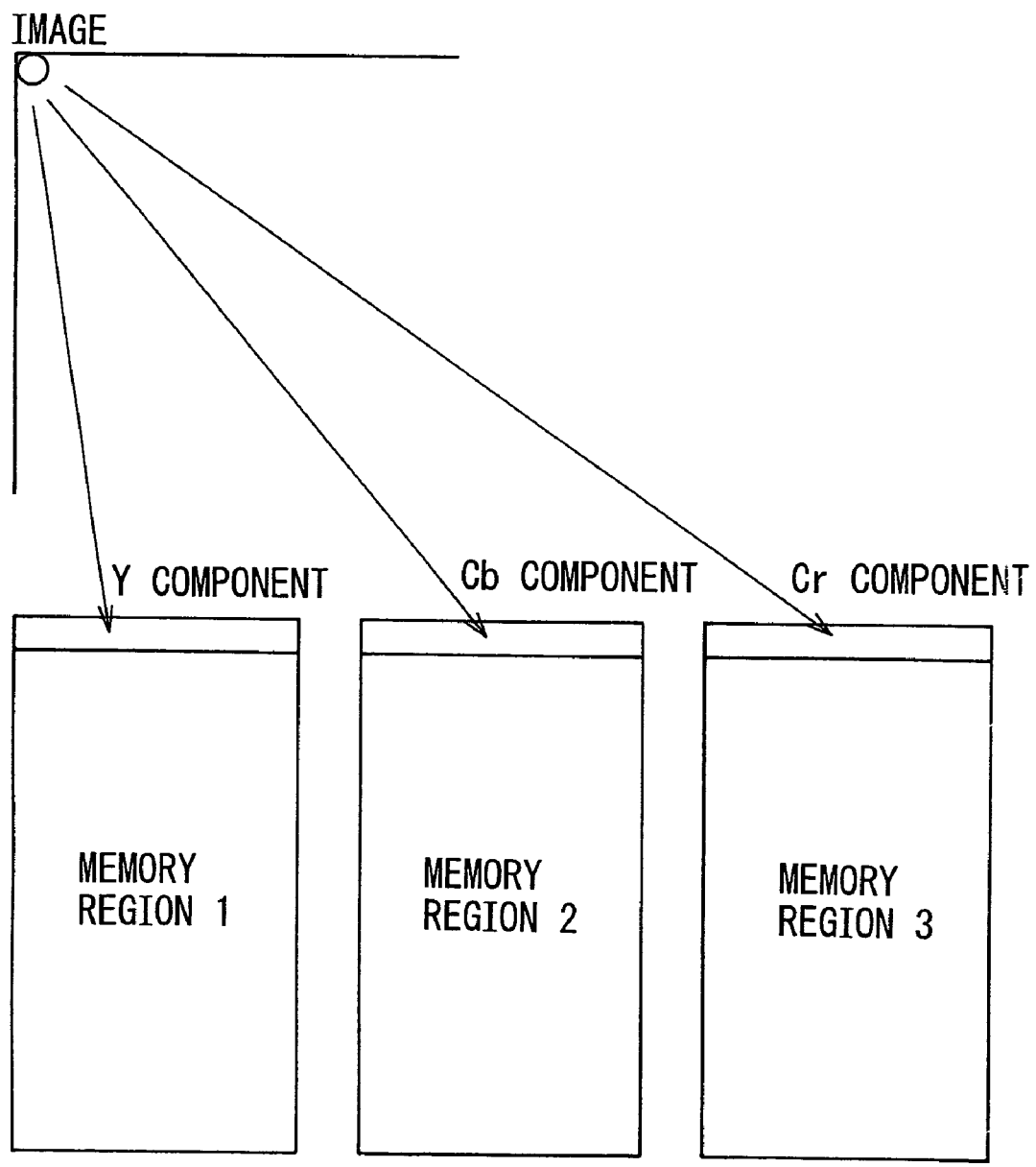
FIG. 4 is a diagram for explaining separation of components of image data.

FIG. 4 shows a state in which image data is separated into each component and the respective components are stored in a plurality of memory regions for each component. As a system for representing the color of each pixel of color image data, there is a representation system called RGB that represents color by red (R), green (G), and blue (B), however, for the JPEG format, the YCbCr representation system in which brightness is represented by Y, luminance and the level difference of blue, by Cb, and luminance and the level difference of red, by CR, is used among the YCC representation system in which representation is performed by brightness and the color difference. FIG. 4 shows a state in which the respective components are assigned on different memory regions and due to such assignment, as shown in FIG. 3A and FIG. 3B, it is made possible to know uniquely a memory location in which information is stored.

FIG. 5A is a diagram showing an image of 8×8 dots, which is the basic unit employed in the basic DCT (discrete cosine transformation) performed in the JPEG encoding process on a screen, and FIG. 5B is a diagram showing how the data is dealt with and at which address. FIG. 5A shows an example of an image of 8×8 dots, the coordinates of the top-left dot of which are (x, y). As shown in FIG. 5A, the basic unit is represented by the uppermost line of the transverse eight dots of coordinates (x, y) to (x+7, y+7) and the lines having the Y coordinates y to y+7. As can be seen from the memory map in FIG. 5B, the data of the eight bits of the transverse line is arranged in order as continuous addresses, however, the data of each line is stored in quite different regions.

Figure 6:
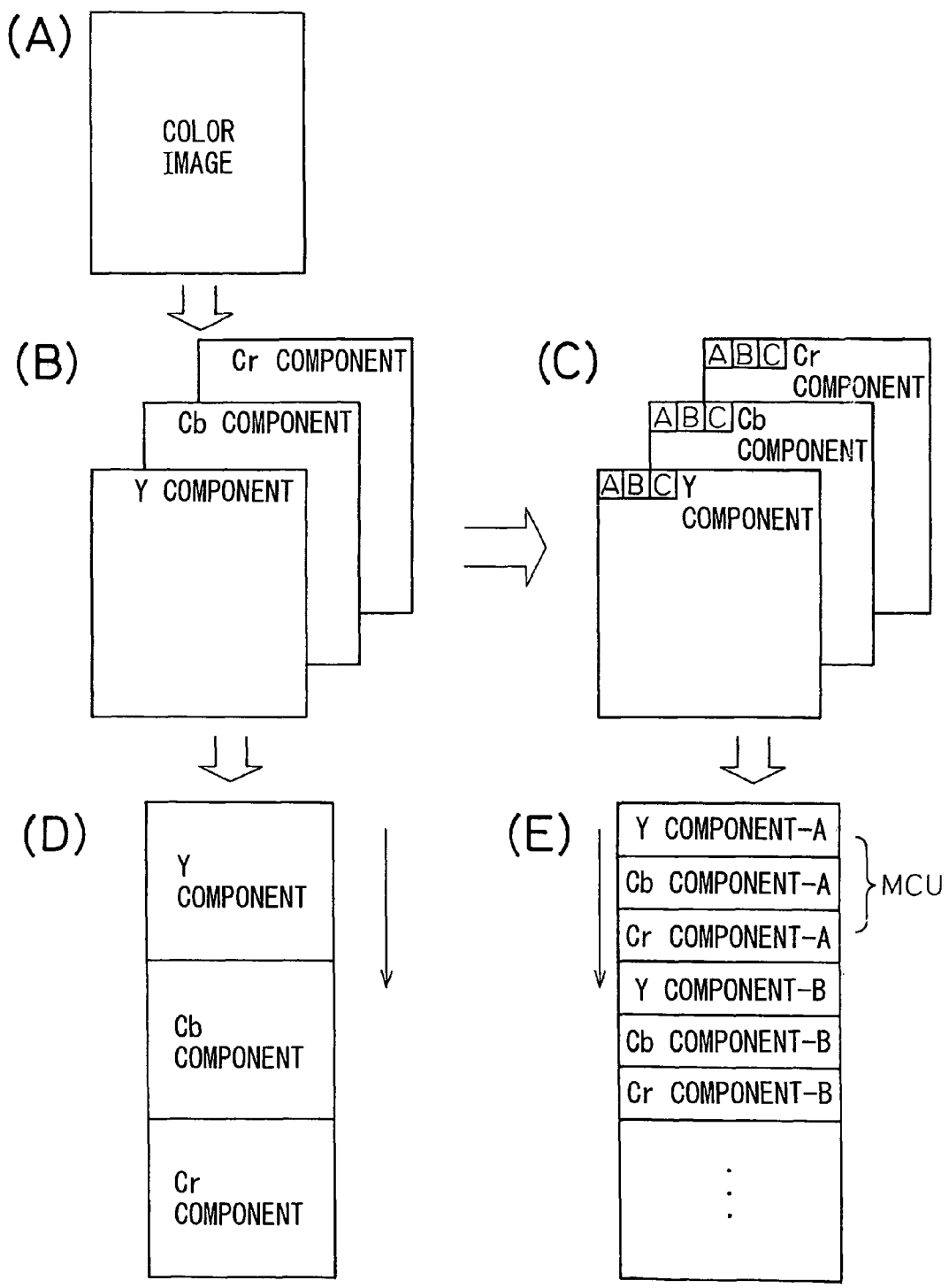
FIG. 6 is a diagram for explaining non-interleaving and interleaving.

FIG. 6 is a diagram for explaining non-interleaving and interleaving in a color image transmission system. In the JPEG format, the color image data in (A) is broken down into the respective color components in the YCbCr color representation system in (B). Here, in the case of interleaving, the color component is divided into small parts for each color component as in (C) and the data of the whole component is sent sequentially in units of small parts as in (E). The small part is called the minimum encoding unit (MCU). In other words, in the case of interleaving, the information of the three components is sent in a mixed state from the initial stage of the data transmission as a result. Due to this, when a Web site on the Internet is used via a low-rate network line, the image is displayed gradually from the top.

On the other side, in the case of non-interleaving, as shown in (D), the color data of the whole screen in the YCbCr color representation system is sent sequentially for each component.

In the JPEG process, it is the rule that non-interleaving is used when the number of components is 1 and interleaving is used when the number of components is 2 or more.

The MCU is constituted by blocks and the number is determined by a sampling factor that determines how many dots are extracted from an original image for each component. In actuality, the sampling factor realizes the reduction of sampling rate and the greatest sampling factor among the sampling factors of each component is called the maximum sampling factor. The sampling rate is obtained as a numeric value of a fraction, the denominator of which is the maximum sampling factor and the numerator, the sampling factor of each component. Sampling factors frequently used in the JPEG format are that the Y component is 2 and the Cb/Cr components are 1. This is because it is very rare that the primary colors appear in a natural image, and therefore, many colors are composite colors of RGB and a change in color difference is small.

Figure 7:
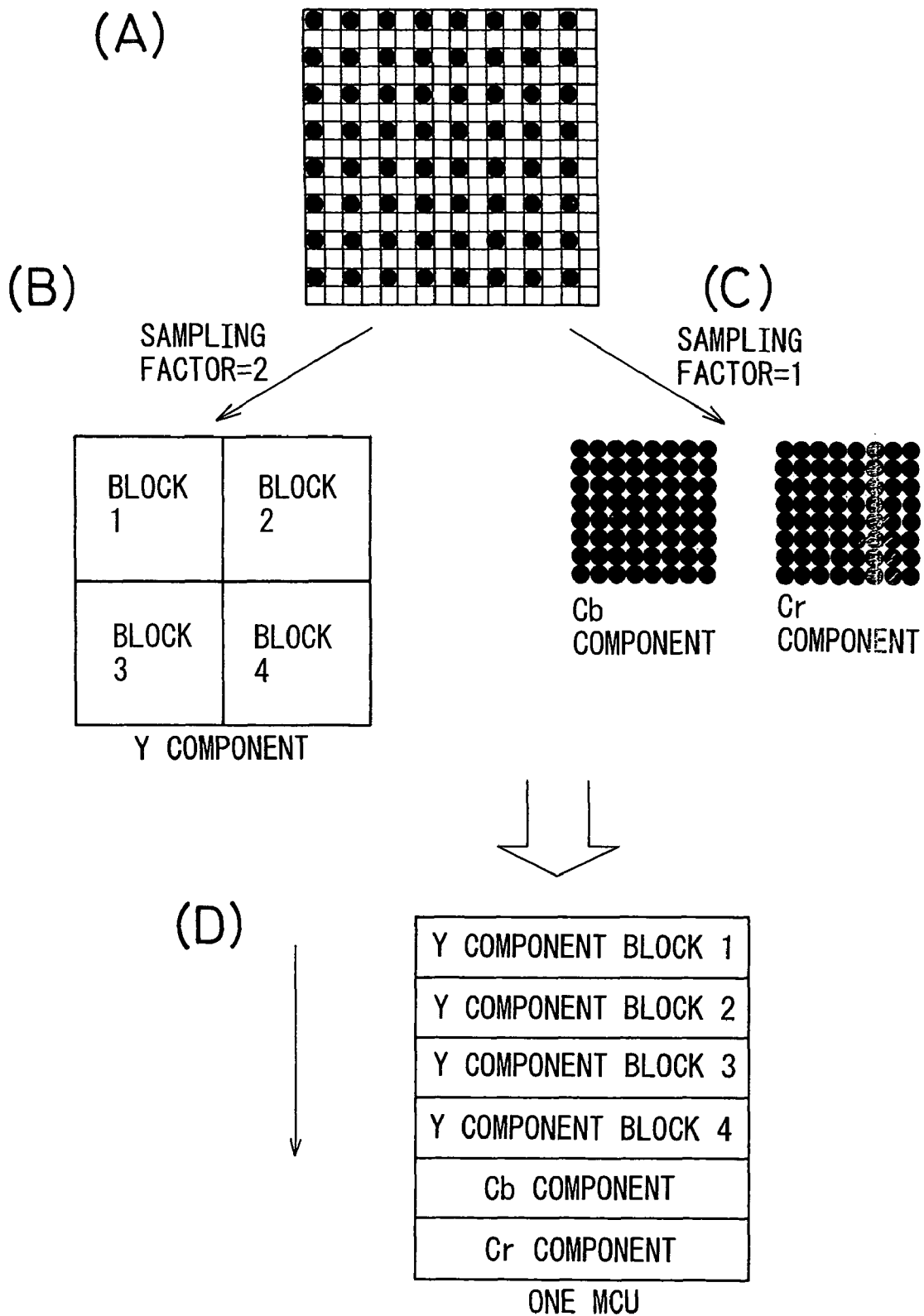
FIG. 7 is a diagram for explaining a configuration of an MCU.

FIG. 7 explains a configuration of an MCU when the Y component is set to 2 and the Cb/Cr components are set to 1 as a sampling factor. In the image data of 16×16 dots in (A), the Cb/Cr components with respect to the Y component in both the longitudinal direction and the transverse direction are ½, respectively, and therefore, as the MCU, there are four blocks of 8×8 dots and as shown in (B), the Y component corresponds to the amount of four blocks and as shown in (C), the Cb/Cr components correspond to the amount of data of one block, respectively. The data is integrated into one MCU as shown in (D). Each component is stored in a memory or transmitted in order as shown schematically.

Next, the access operation of an SDRAM (synchronous DRAM) frequently used as a buffer memory in which image data is stored.

Figure 8:
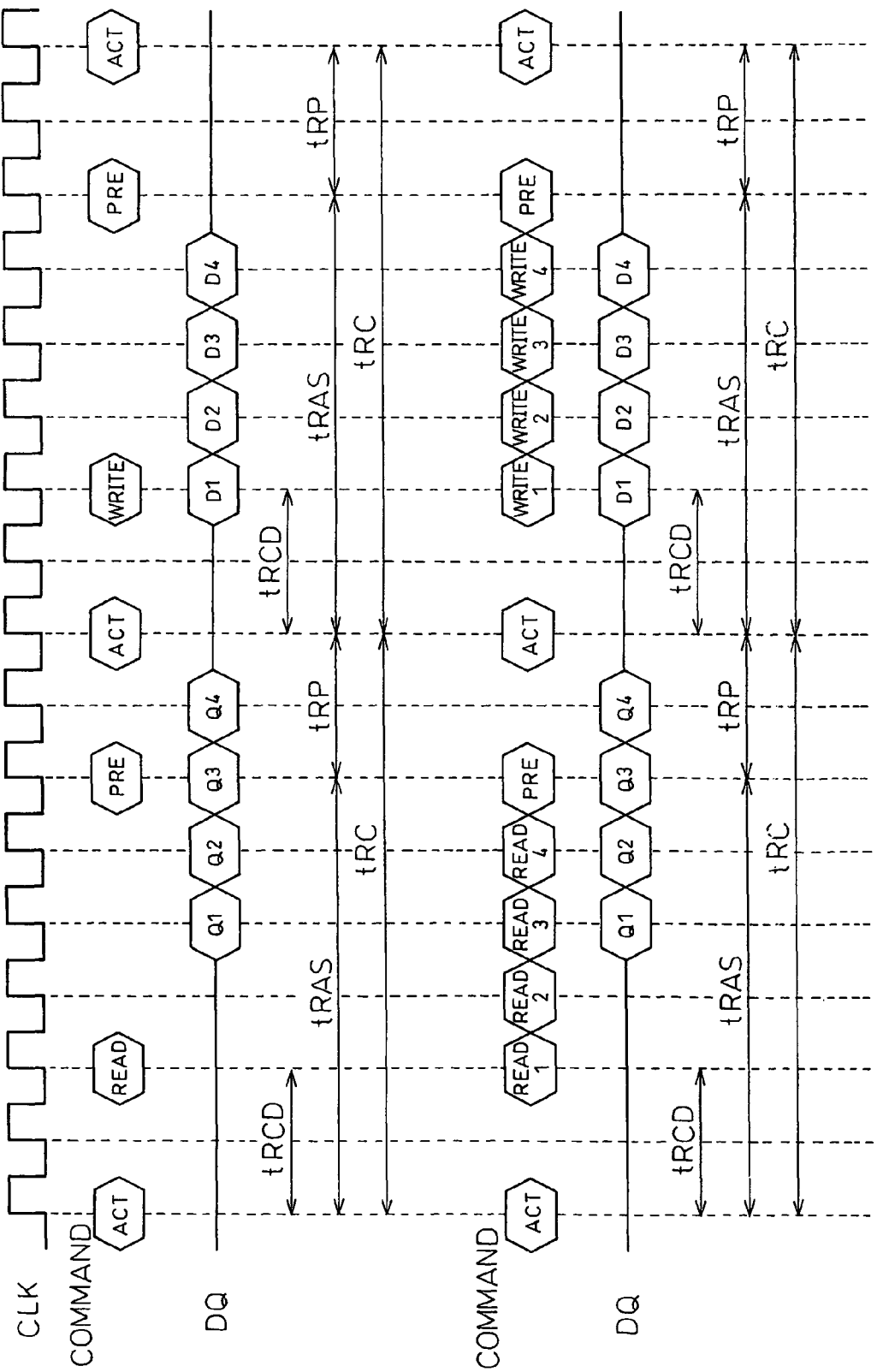
FIG. 8 is a time chart showing an access sequence of an SDRAM.
Figure 9:
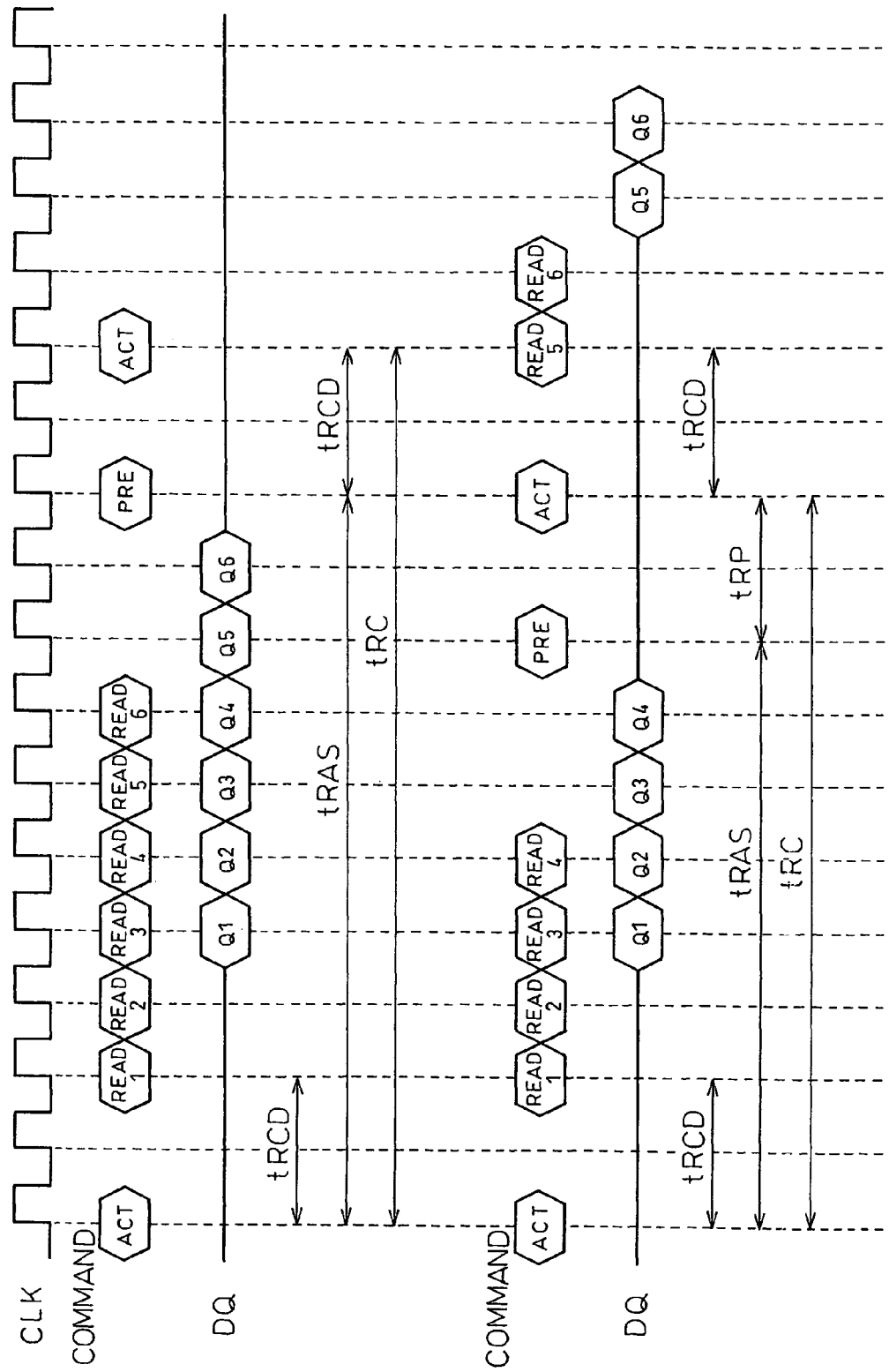
FIG. 9 is a time chart showing a read access sequence of an SDRAM.

FIG. 8 and FIG. 9 are time charts of an example of the access operation in which the write operation is performed after the read operation in an SDRAM. FIG. 8 shows the case of CL (CAS latency)=2 and four-word continuous access, and the upper half shows the case of BL (burst length)=4, and the lower half shows the case of BL=1. In the example of the lower half, BL is different, however, it is made possible to access with the same cycle time as that in the case of the upper half, where BL is large, by performing a page mode operation.

FIG. 9 shows the operation when 4+2 words are read and accessed. The upper half shows the case of the same page and the lower half shows the case of not the same page. In a SDRAM, in the case of not the same page, it is necessary to provide a ROW address for determining the page, and therefore, a large difference, such as from 12 CLK cycles to 19 CLK cycles, is occurs for the same 4+2-word access. In other words, when data is transmitted to an SDRAM, high rate transmission can be realized if continuous addresses on the same page are accessed.

The storage of image data in the JPEG format and the data transmission of an SDRAM are explained above, however, they are widely known and therefore a further explanation is omitted.

Figure 10:
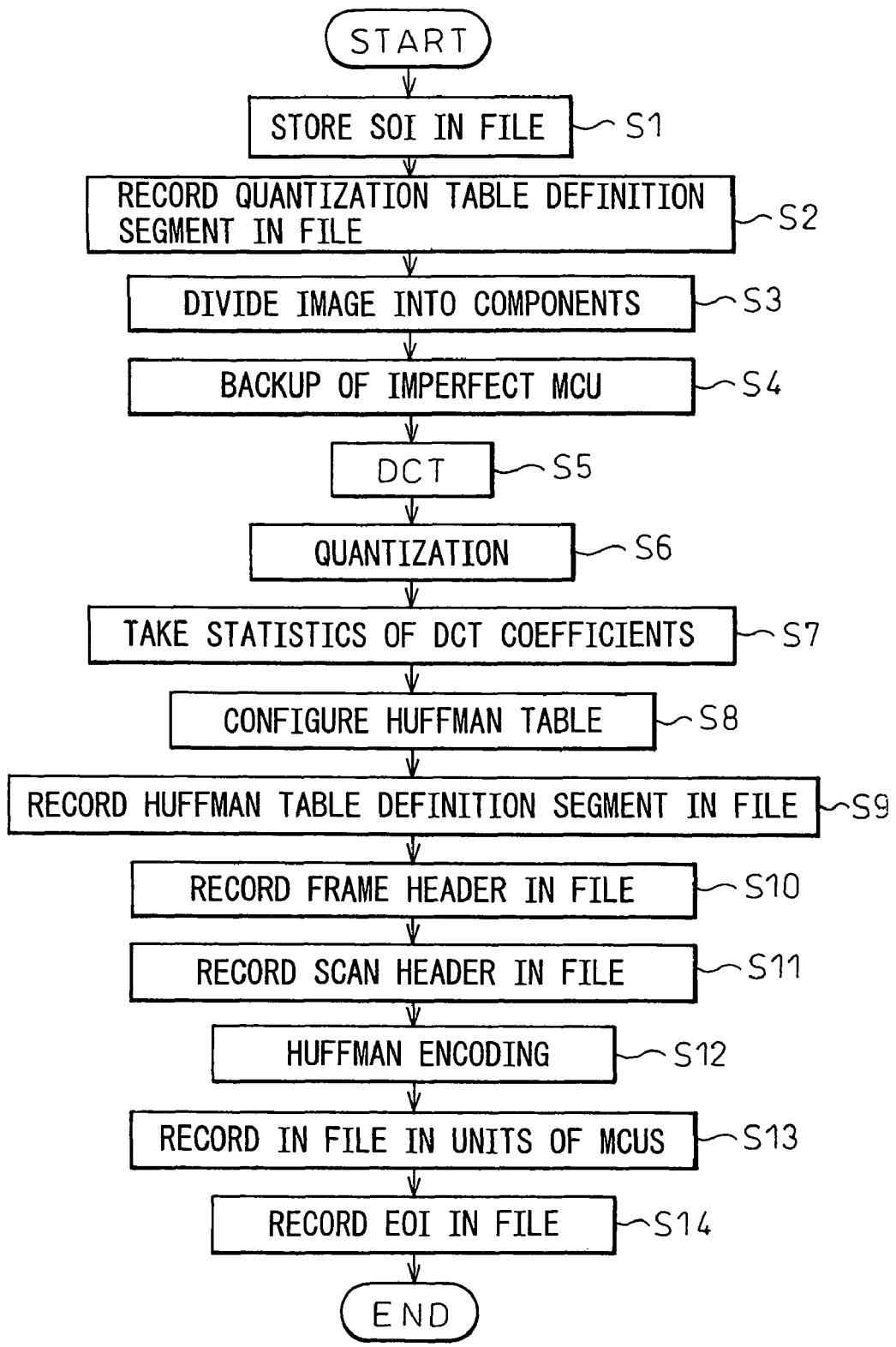
FIG. 10 is a flow chart showing a flow of the encoding process.
Figure 11:
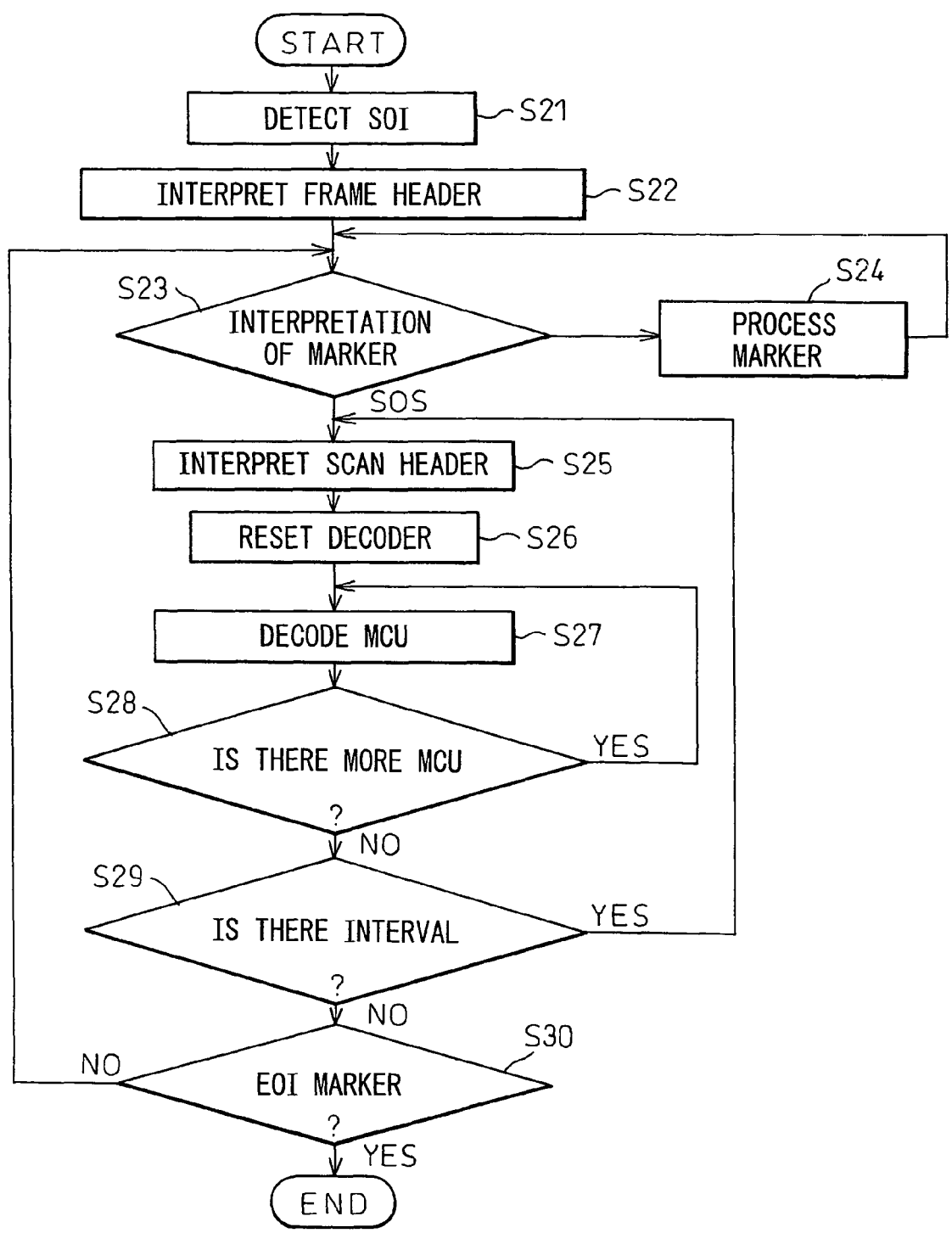
FIG. 11 is a flow chart showing a flow of the decoding process.

FIG. 10 is a flow chart showing the flow of the JPEG encoding process and FIG. 11 is a flow chart showing the flow of the JPEG decoding process.

In FIG. 10, the processes in steps S7 and S8 can be omitted by using a Huffman code table. Further, as to the quantization table recorded in step S2, it is also possible to experimentally find an optimum value for an input image and an output device, however, instead of this, in some cases, a table with which a so-called natural image can be displayed on a display at a certain quality a is frequently used.

The main processes relating to the present invention are the processes in steps S5 and S6 and, in particular, the process in S12 is the most complex process.

In FIG. 11, the main process relating to the present invention is the process in step S27.

In other words, the processes in steps S5, S6, and S12 in FIG. 10 and the process in step S27 in FIG. 11 constitute the majority of the processes performed by the plurality of the JPEG processing cores 27A to 27D. In the present embodiment, these processes are performed efficiently at high speed and power consumption when these processes are performed is reduced.

As the JPEG encoding/decoding process is widely known, a further explanation is not given.

Next, the data transmission between the general-purpose memory 2 for storing the YCbCr image data and JPEG image data, and the JPEG processing section 14, and the data access during the period of the JPEG encoding/decoding process in the embodiment are explained.

Figure 12:
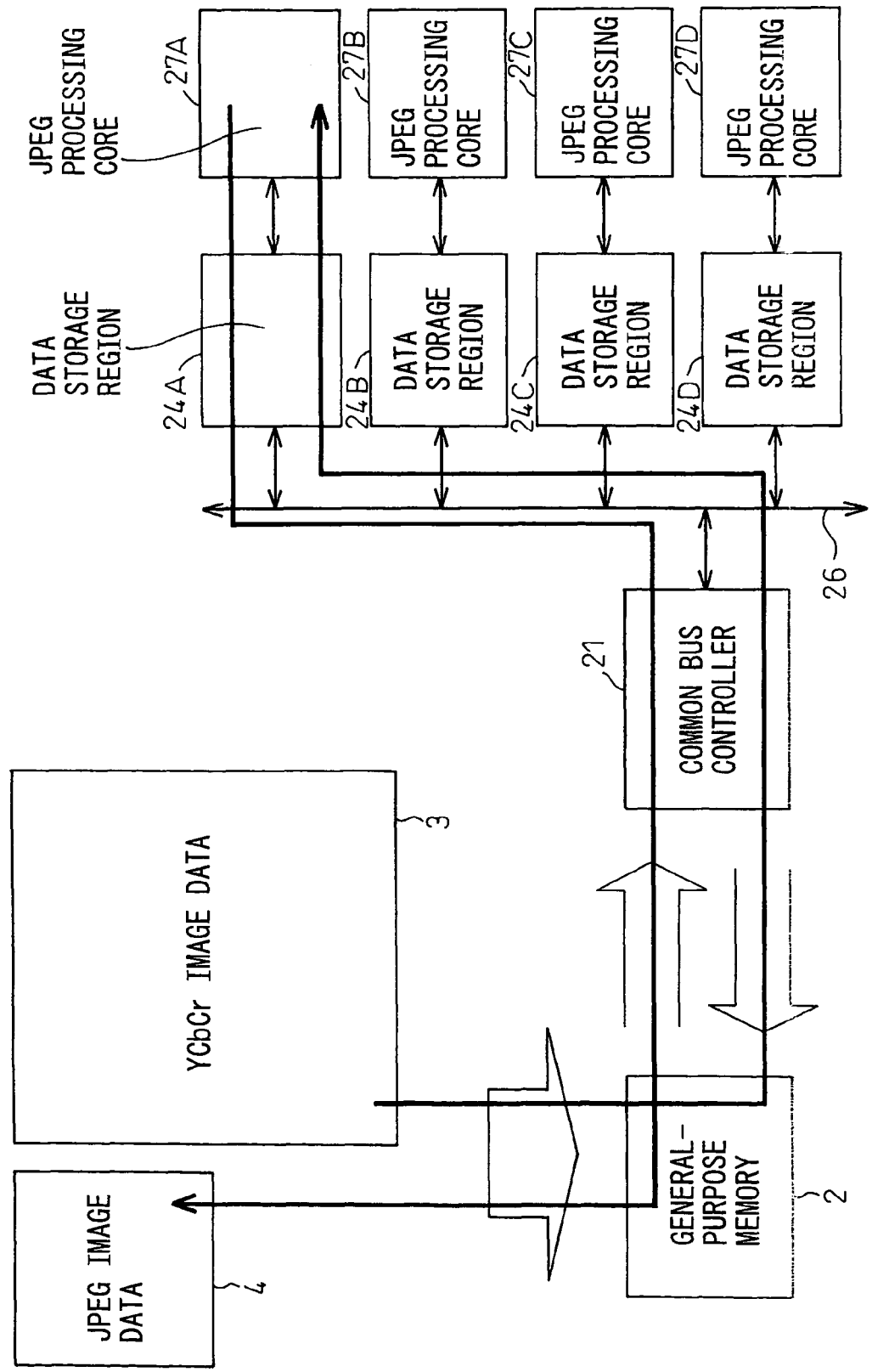
FIG. 12 is a diagram showing a flow of data during the period of encoding process.

FIG. 12 is a diagram for explaining the flow of image data during the period of the encoding process. The image data to be processed is divided into the minimum encoding units (MCUs) and each MCU is processed in the JPEG processing cores 27A to 27D. As will be described later, the number of JPEG processing cores to be operated is adequately set, however, it is assumed here that the four JPEG processing cores 27A to 27D perform the process. As described above, in the configuration as shown in FIG. 2, in which the four JPEG processing cores 27A to 27D and the four data storage regions 24A to 24D are connected by the second internal bus 28, it is possible for each of the JPEG processing cores to access any one of the data storage regions. Each of the JPEG processing cores accesses the data storage region, to which the MCU to be processed is transmitted, to perform the process.

By the way, it may also be possible to configure such that the four JPEG processing cores 27A to 27D and the four data storage regions 24A to 24D are made to correspond to each other in a one-to-one relationship and one JPEG processing core is capable of accessing only one of the data storage regions 24A to 24D. With this configuration, each of the JPEG processing cores is capable of accessing the dedicated data storage region at all times, and the process rate of the JPEG process by each of the JPEG processing cores is improved.

Here, an explanation is given on the assumption that the four JPEG processing cores 27A to 27D handle the MCU transmitted to the four data storage regions 24A to 24D, respectively, and access each of them.

When the encoding process is performed, data to be processed by the four JPEG processing cores 27A to 27D among the YCbCr image data 3 stored in the general-purpose memory 2 is transmitted to the corresponding four data storage regions 24A to 24D in the burst mode via the common bus controller 21 and the common bus 11. The data transmission is performed by obtaining the occupation right of the bus from the bus arbiter 12. Next, the four JPEG processing cores 27A to 27D access the corresponding data storage regions 24A to 24D and perform the encoding process to the transmitted YCbCr image data. As this process can be executed without performing the transmission of image data by the JPEG processing section 14 via the common bus controller 21 and the common bus 11, no time is required for waiting for assignment of the common bus 11, and therefore, the processing rate is high and other components are not prevented from accessing the common bus 11. The JPEG image data having been subjected to the encoding process is stored temporarily in the corresponding data storage regions 24A to 24D. When the encoding process of the transmitted data by the four JPEG processing cores 27A to 27D is finished, the JPEG image data stored in the storage regions 24A to 24D is transmitted to the storage region of the JPEG image data 4 in the general-purpose memory 2 via the common bus controller 21. This transmission is performed by obtaining the occupation right of the bus from the bus arbiter 12.

When the decoding process is performed, the data to be processed by the four JPEG processing cores 27A to 27D among the JPEG image data 4 stored in the general-purpose memory 2 is transmitted to the corresponding four data storage regions 24A to 24D in the burst mode via the common bus controller 21 and the common bus 11.

This transmission is performed by obtaining the occupation right of the bus from the bus arbiter 12. Next, the four JPEG processing cores 27A to 27D access the corresponding data storage regions 24A to 24D and perform the encoding process to the transmitted YCbCr image data. As described above, the processing rate of the process is high and other components are not prevented from accessing the common bus 11. The YCbCr image data having been subjected to the decoding process is stored temporarily in the corresponding storage regions 24A to 24D. When the decoding process of the transmitted data by the four JPEG processing cores 27A to 27D is finished, the YCbCr image data stored in the storage regions 24A to 24D is transmitted to the storage region of the YCbCr image data 3 in the general-purpose memory 2 via the common bus controller 21 and the common bus controller 21. This transmission is performed by obtaining the occupation right of the bus from the bus arbiter 12. In other words, when the decoding process is performed, the data transmission in the opposite direction to that at the time of the encoding process shown in FIG. 12 is performed.

As to addressing in the access to the general-purpose memory 2 using the common bus 11, as described above, it is possible to uniquely determine an address depending on which MCU the data is desired to be taken from, in the case of the encoding process. Further, in the case of the decoding process, it is also possible to easily transmit and arrange the JPEG image data stored in the data storage regions 24A to 24D sequentially in MCU units, because the data having the same structure as that of the JPEG image data corresponding to the MCU unit is lined up in order.

Further, as mentioned above, from the consideration point of the efficient use of the common bus 11, it is essential to transmit in the burst mode as long as it is possible, however, even if not transmitted in the burst mode, it is possible for the JPEG processing core to perform the process without directly using the common bus 11, and therefore, the processing rate can be improved compared to the conventional case.

Figure 13:
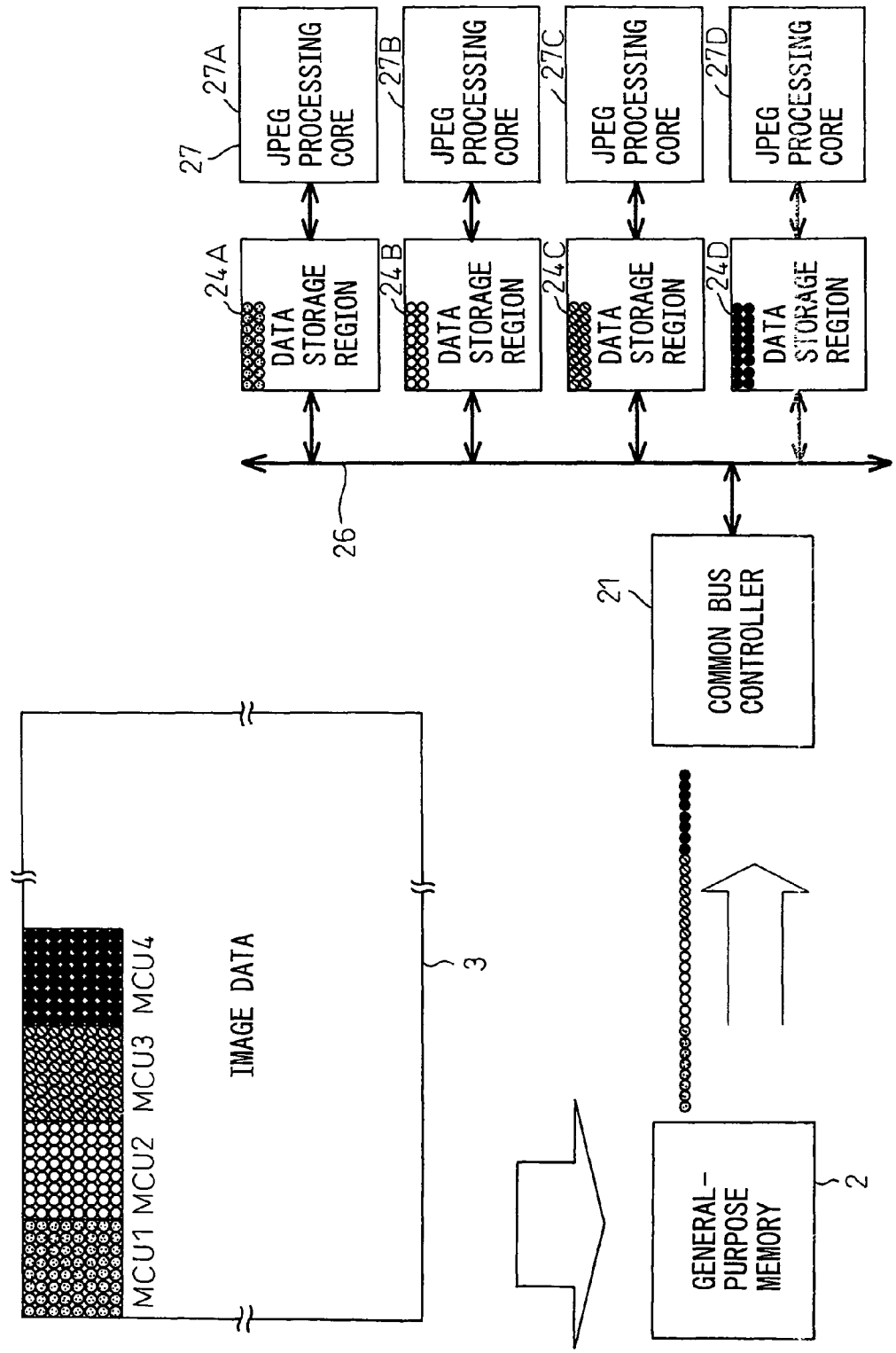
FIG. 13 is a diagram for explaining data transmission from a general-purpose memory to a data storage region during the period of JPEG encoding process.

FIG. 13 shows how the data transmission of the four MCU1, MCU2, MCU3, and MCU4 is performed from the general-purpose memory 2 to the data storage regions 24A to 24D in the burst mode.

Each MCU is assumed to be the data of Y, Cb, and Cr, as the configuration in FIG. 7. As shown in FIG. 13, when data corresponding to four MCUs is taken in, the data corresponding to 16 dots in the transverse direction needs to be taken in for the Y component per MCU, therefore, in the case of four MCU, data corresponding to 64 dots in total is lined up sequentially. Data of one dot is one byte and, in many cases, the bus width of the general-purpose memory 2 is normally set to $^{32}/_{64}$ bits ($^{4}/_{8}$ bytes), the same as the bus width of the main processor. Here, if the bus width is assumed to be 32 bits, it is possible to take in data in one transverse row of the Y component corresponding to four MCUs by performing access in the 16-burst mode.

In contrast to this, the data of Cb and Cr is taken in by the 8-burst access, half the 16-burst access.

By the data transmission of one transverse row as described above, the data corresponding to four MCUs is taken in by taking in 16 rows for the Y component and 8 rows for the Cb and Cr components.

Figure 14:
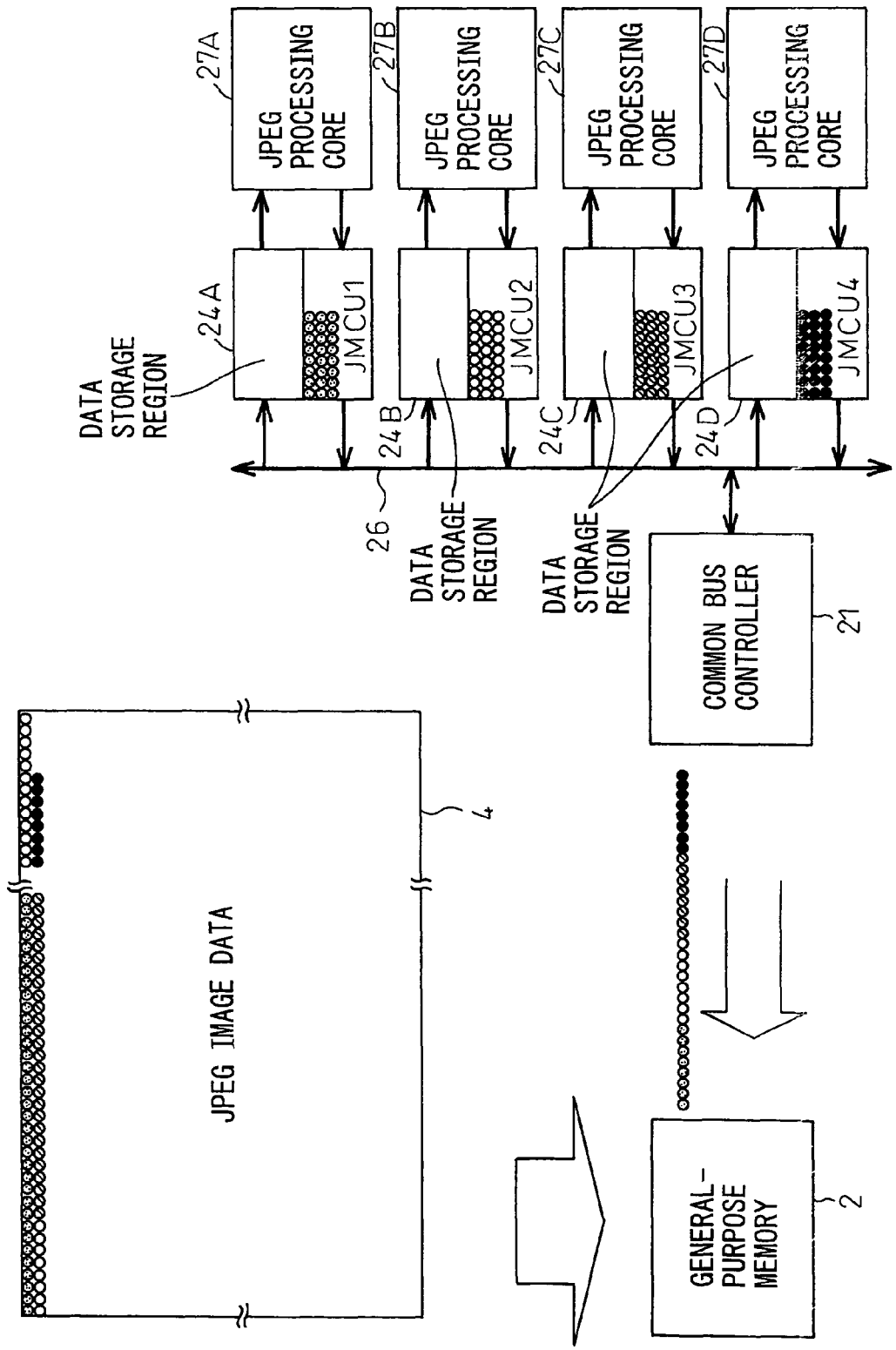
FIG. 14 is a diagram for explaining data transmission from a data storage region to a general-purpose memory during the period of JPEG encoding process.

FIG. 14 shows how the data transmission of the four JPEG image data JMCU1, JMCU2, JMCU3, and JMCU4 encoded from the MCU1, MCU2, MCU3, and MCU4 is performed in the burst mode from the data storage regions 24A to 24D to the general-purpose memory 2. The JPEG image data JMCU1, JMCU2, JMCU3, and JMCU4 stored in the data storage regions 24A to 24D has the same data structure as that of the JPEG image data 4, therefore, it is only required to transmit the data sequentially and arrange it as it is in the region of the JPEG image data in the general-purpose memory 2.

Next, the configuration of the data storage regions 24A to 24D and the data to be input thereto are described.

Figure 15:
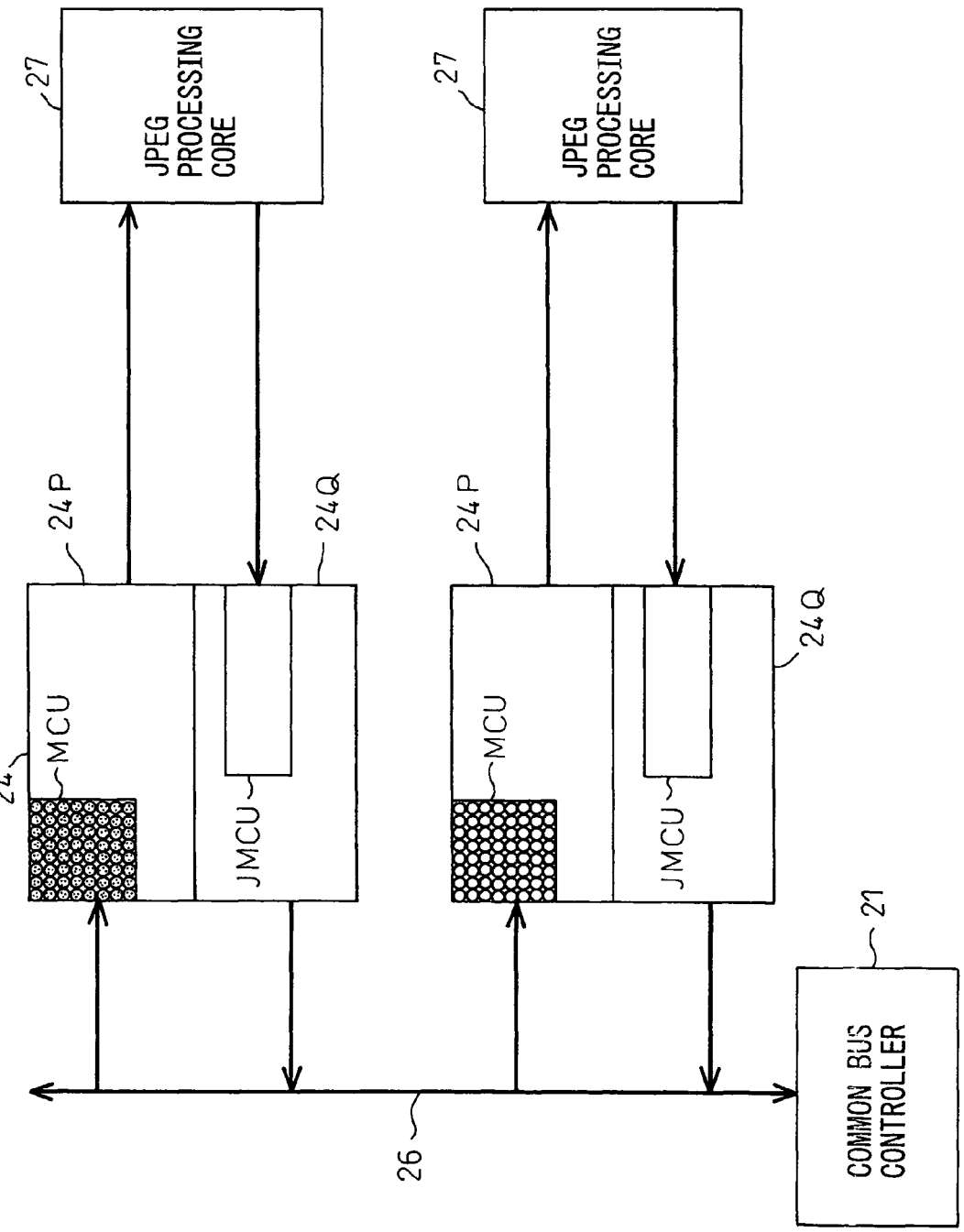
FIG. 15 is a diagram showing a configuration of a data storage region.

FIG. 15 shows the configuration of the data storage region 24. Because the data storage region 24 stores both the data to be subjected to the encoding/decoding process and the data having been subjected to the process, the data storage region 24 is constituted by a region 24P for storing MCU before the process and a region 24Q for storing JMCU, which is processed MCU, as shown in FIG. 15.

Further, as to the addressing on both the data, it is thought that a form, in which a control can be taken independently by either a theoretical method or a physical method, is advantageous with respect to performance. In the present embodiment, it is intended that one MCU be stored in one data storage region 24P and one JMCU be stored in one data storage region 24Q when data is taken in through the common bus controller 21. Here, the framework of the data storage region 24 is shown as if theoretically or physically independent, however, it is not necessarily required for all regions to be physically independent.

The data addressing between the data storage region 24 and the common bus controller 21 and the data addressing between the data storage region 24 and the JPEG processing core 27 can be performed in any arbitrary manner.

Figure 16:
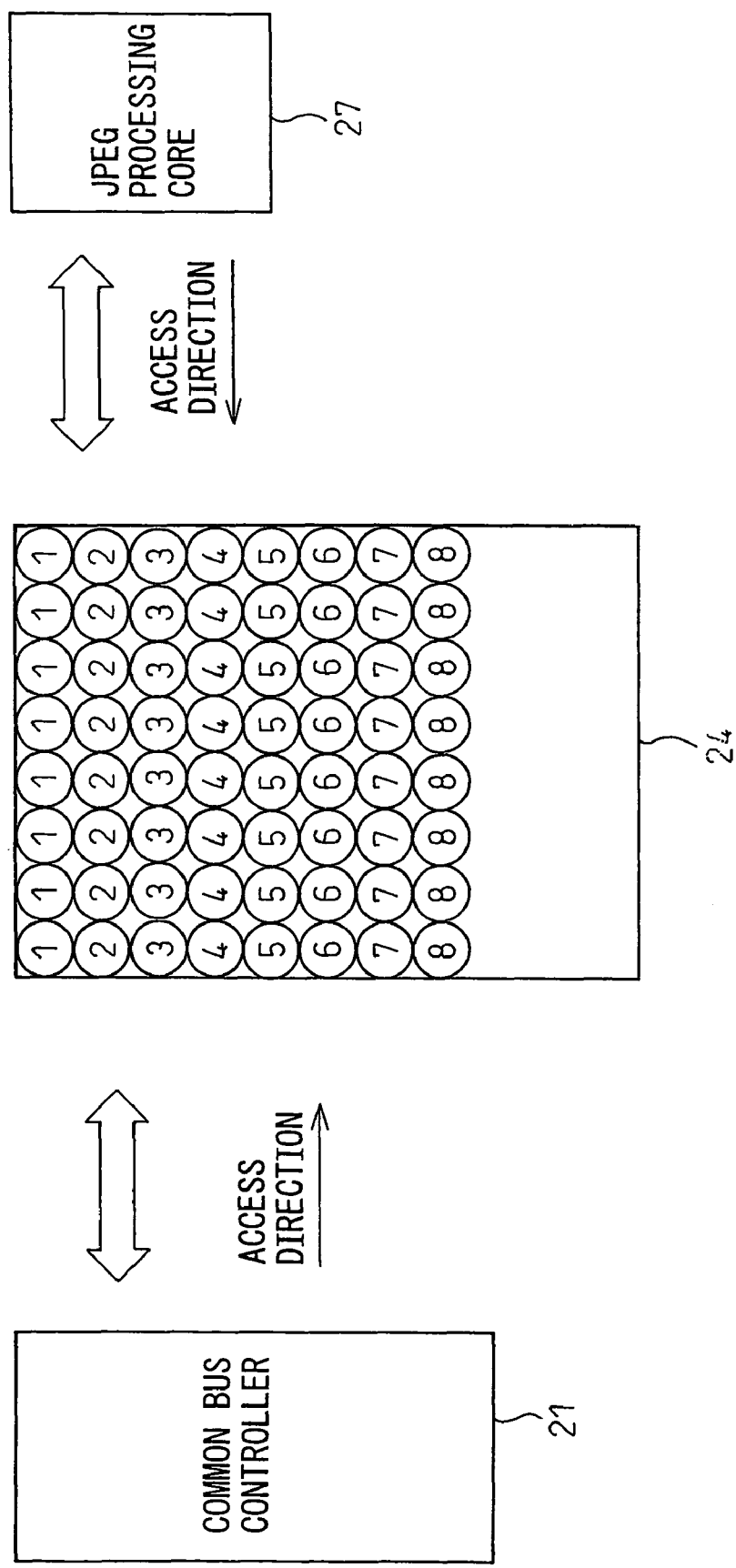
FIG. 16 is a diagram for explaining the operation of a FIFO system data storage region.

FIG. 16 is a diagram showing the operation of the FIFO system data storage region 24. With the FIFO system, it is possible to identify data without performing special addressing. By directing to access the data storage region 24 from the common bus controller 21, specifically, by directing to write or read data, the data transmission is performed between the first internal bus 26 and the data storage region 24 with the whole data as one collection of data. Further, by direction to access the data storage region 24 from the JPEG processing core 27 via the control section in JPEG processing section 25, the data transmission is performed between the first internal bus 26 and the data storage region 24 with the whole data as one collection of data.

The FIFO system data storage region 24 can be realized by a FIFO memory. In this case, the region 24P for storing the MCU before the process and the region 24Q for storing the data JMCU, which is the processed MCU, are constituted by different FIFO memories and their input/output directions are reversed with respect to each other.

However, when retransmission of part of the data is required, the FIFO system is disadvantageous.

Figure 17:
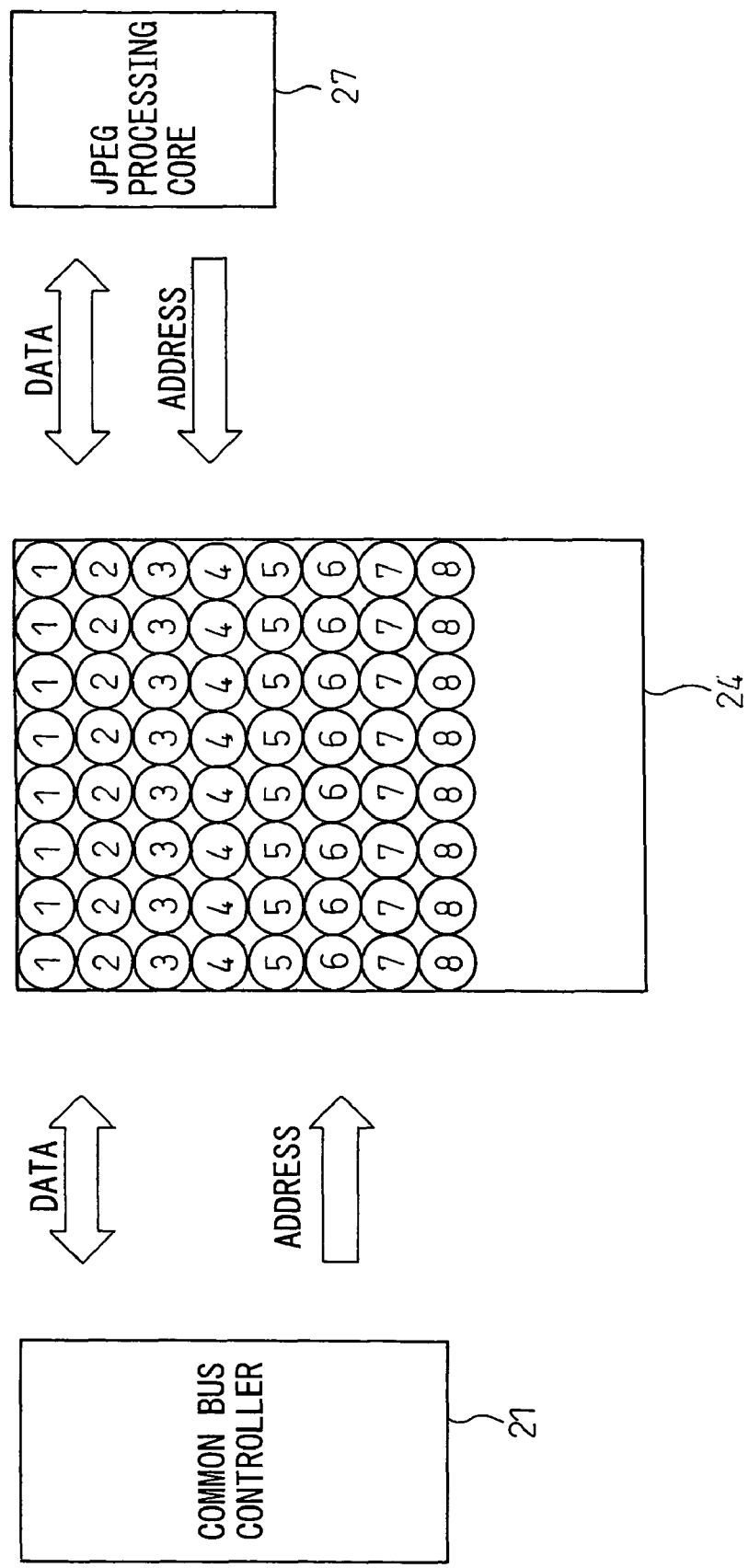
FIG. 17 is a diagram for explaining the operation of an address system data storage region.

Instead of the FIFO system data storage region 24 in FIG. 16, it is also possible to use the data storage region 24 of a system in which addressing is performed by specifying an address, which is a general access system when connection is made by a bus. FIG. 17 is a diagram showing the operation of the data storage region 24 in this case.

In the addressing system in FIG. 17, the data storage region 24 is accessed by specifying an address from the common bus controller 21 and the JPEG processing core 27. In the other words, when performing a read, the address of the data storage region 24 at which data to be read is stored is specified, and when performing a write, the address of the data storage region 24 at which data to be written is stored is specified. In the case of this system, the data storage region 24 is constituted by, for example, a dual port memory.

With a system using this addressing, operations, such as retransmission, are easy, however, compared to the FIFO system, the procedure to take out data and an address judgment circuit are necessary.

In the configuration examples in FIG. 16 and FIG. 17, the same addressing system is employed between the common bus controller 21 and the data storage region 24 and between the JPEG processing core 27 and the data storage region 24, however, it is also possible to change either addressing system to a different one. For example, it is possible to employ a system between the common bus controller 21 and the data storage region 24, in which addressing is performed by specifying an address, and the FIFO system between the JPEG processing core 27 and the data storage region 24, and vice versa.

Figure 18:
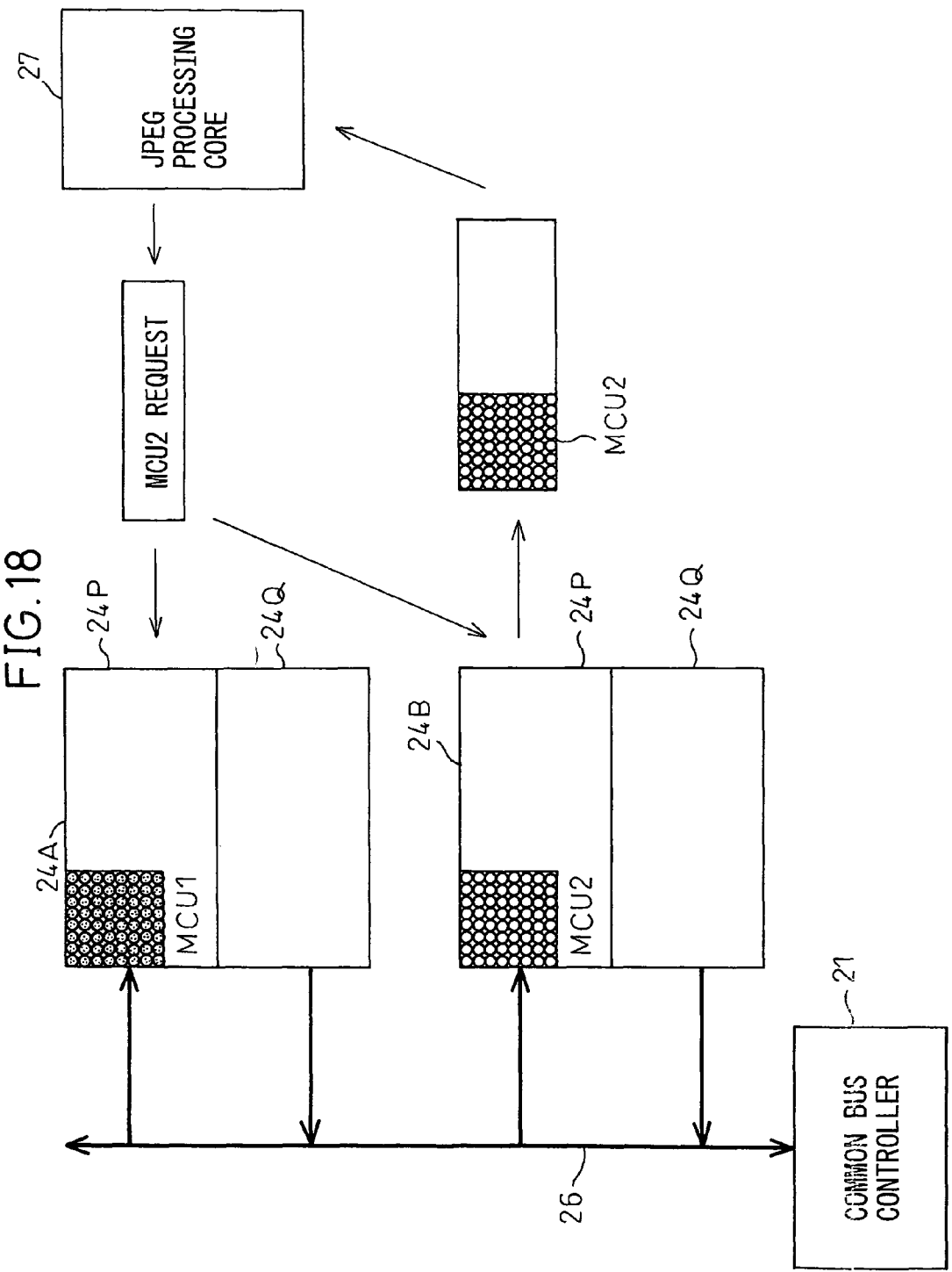
FIG. 18 is a diagram for explaining the operation of a packet system data storage region.

Further, as shown in FIG. 18, such a data transmission system is also possible, in which, between the data storage region 24 and the JPEG processing core 27, a packet is transmitted, which packet orders to transmit data (here, MCU2) that is specified by the MCU number for each of the data storage regions 24A and 24B from the JPEG processing core 27, and the data storage region (here, 24B) having data of the MCU number corresponding thereto transmits a response packet. This also applies to the case where the process result in the JPEG processing core 27 is stored in the data storage region 24.

In the case of the present invention, as to addressing to the data storage region, any system may be used as long as data transmission can be performed between the common bus controller 21 and the data storage region 24, and data transmission can be performed between the data storage region 24 and the JPEG processing core 27, however, it is necessary to determine in a form suited to a control method of the first internal bus 26 by the common bus controller 21. Further, the configuration of the data storage region 27 is determined adequately depending on which addressing method is used.

Figure 19:
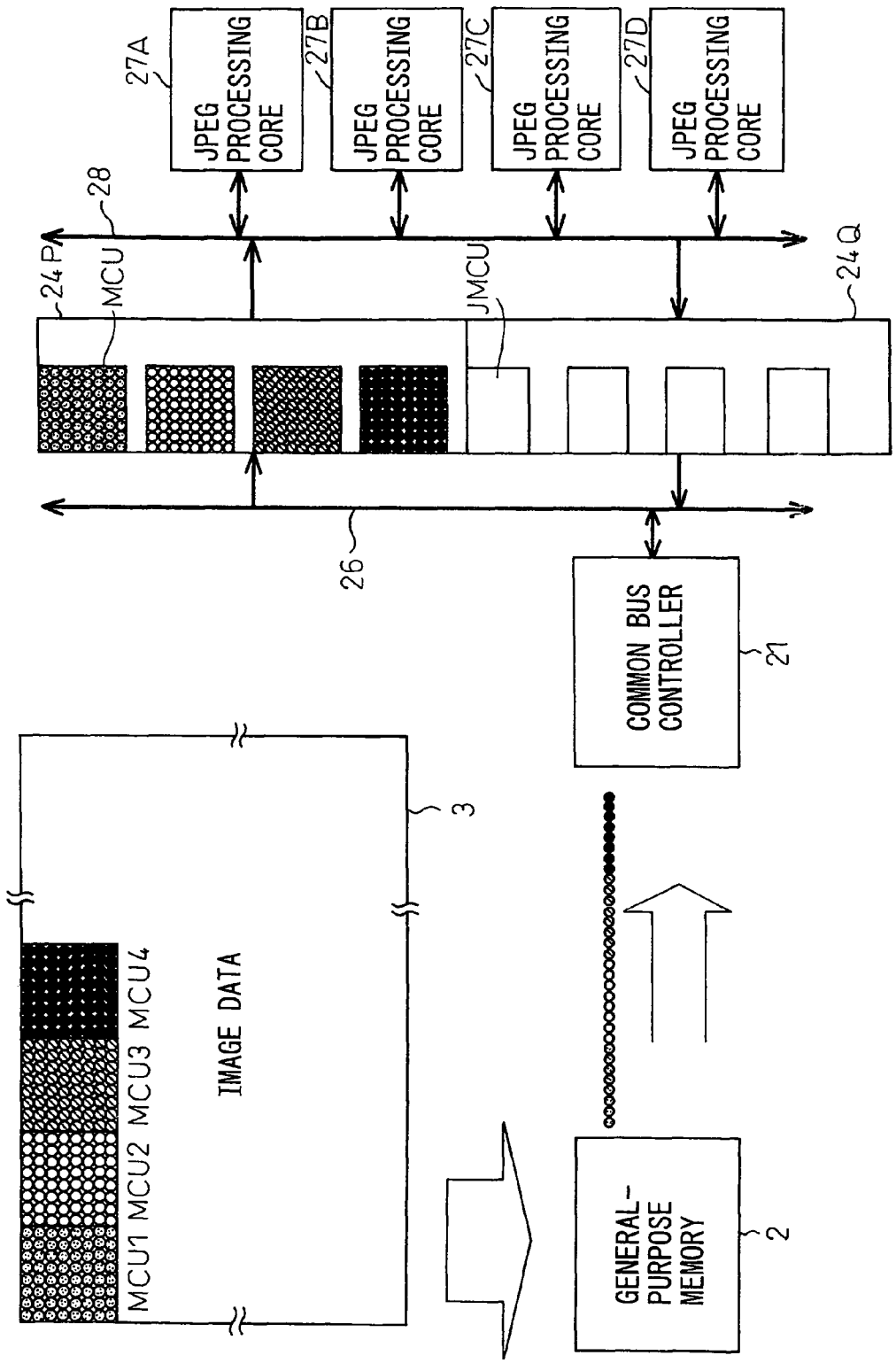
FIG. 19 is a diagram for explaining a data storage region for storing a plurality of MCUs.

By the way, in FIG. 12 to FIG. 14, each MCU and each JMCU are shown such that they are stored in the physically independent data storage region, however, as shown in FIG. 19, even when a plurality of MCUs and JMCUs are stored in one physically single data storage region, if they are theoretically separated by the addresses in the second internal bus between the data storage region and the JPEG processing core, they are theoretically equivalent to each other.

FIG. 20A and FIG. 20B show time charts of data transmission from the general-purpose memory 2 to each of the data storage regions 24 in the case of the system in which addressing is performed by addressing an address shown in FIG. 17; FIG. 20A shows transmission from the general-purpose memory 2 to the common bus controller 21 and FIG. 20B shows transmission from the common controller 21 to each of the data storage regions 24.

As shown in FIG. 20A, the common bus controller 21 requests the bus request (BusReq) from the bus arbiter 12 and when bus acknowledgment (BusAck) is issued, the address of the general-purpose memory 2, at which the MCU to be transmitted is stored, is output. In response to this, the general-purpose memory 2 prepares to output the data and when preparations are made, after a lapse of a predetermined period of time, the data is output successively for a predetermined number of cycles (here, seven successive cycles). The common bus controller 21 takes in data output to the common bus 11.

As shown in FIG. 20B, after taking in the data, the common bus controller 21 outputs the address and the data taken in to the first internal bus 26 and writes them in the data storage region 24. The common bus controller 21 may output the data taken in as it is (in a through manner) to the first internal bus 26 or may output to the first internal bus 26 after buffering temporarily.

FIG. 21A and FIG. 21B show time charts of data transmission from each of the storage regions 24 to the general-purpose memory 2 in the case of the system in which addressing is performed by specifying an address shown in FIG. 17; FIG. 21A shows transmission from each of the data storage regions 24 to the common controller 21 and FIG. 21B shows transmission from the common bus controller 21 to the general-purpose memory 2.

As shown in FIG. 21A, the common bus controller 21 outputs the address of each of the storage regions 24 at which the JMCU is stored to the first internal bus 26 and each of the storage regions 24 outputs the JMCU data at the directed address to the first internal bus 26. The common bus controller 21 takes in the data output to the first common bus 11. The common bus controller 21 takes in the data output to the first internal bus 26.

As shown in FIG. 21B, the common bus controller 21 requests the bus request (BusReq) from the bus arbiter 12 and when bus acknowledgment (BusAck) is issued, the address of the general-purpose memory 2 at which the JMCU to be transmitted is stored is output and at the same time, data is output to the common bus 11 successively for a predetermined number of cycles (here, seven successive cycles). In response to this, the general-purpose memory 2 takes in the data on the common bus 11 and stores it in a directed address.

Figure 22A:
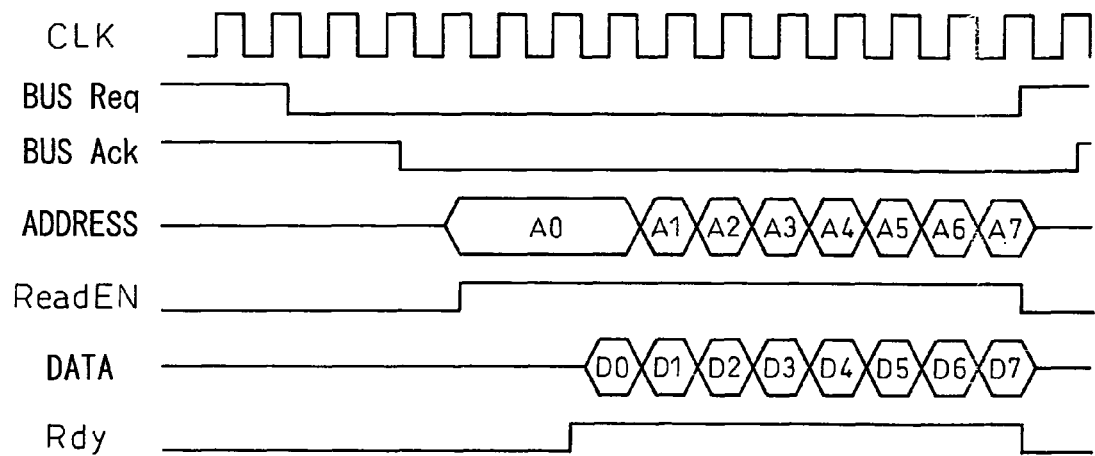
FIG. 22A and FIG. 22B are time charts of data transmission between a JPEG processing core and a data storage region.
Figure 22B:
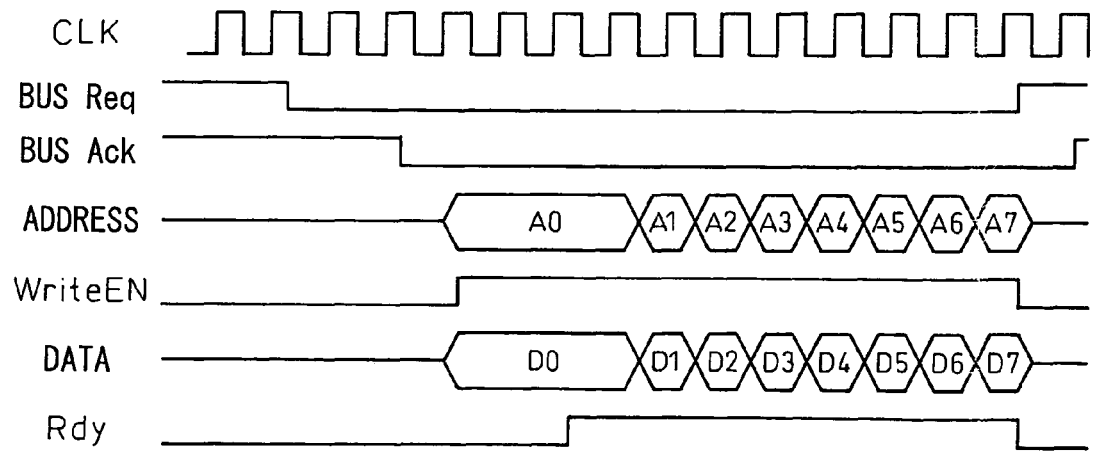

FIG. 22A and FIG. 22B show time charts of data transmission between each of the JPEG processing cores 27 and each of the data storage regions 24 in the case of the system in which addressing is performed by addressing an address shown in FIG. 17; FIG. 22A shows data transmission from the data storage region 24 to the JPEG processing core 27 and FIG. 22B shows data transmission from the JPEG processing core 27 to the data storage region 24.

As shown in FIG. 22A, the JPEG processing core 27 requests the bus request (BusReq) of the second internal bus 28 from the control section in JPEG processing section 25 and when bus acknowledgment (BusAck) is issued, the address of the data storage region 24 at which the MCU to be processed is stored is output to the second internal bus 28. In response to this, the data storage region 24 prepares to output the data and when preparations are made after a lapse of a predetermined period of time, the data is output to the second internal bus successively for a predetermined number of cycles (here, seven successive cycles). The JPEG processing core 27 takes in data output to the second internal bus 28.

As shown in FIG. 22B, the JPEG processing core 27 requests the bus request (BusReq) of the second internal bus 28 from the control section in JPEG processing section 25 and when bus acknowledgment (BusAck) is issued, the address of the data storage region 24 at which the processed JMCU is stored is output to the second internal bus 28 and at the same time, the processed data is output. In response to this, the data storage region 24 prepares to take in (write) the data and when preparations are made after a lapse of a predetermined period of time, the data is written successively for a predetermined number of cycles (here, seven successive cycles).

By the way, as shown in FIG. 15, the data storage region 24 is constituted by the region 24P for storing unprocessed data and the region 24Q for storing processed data and, therefore, after the process is finished and the JMCU is stored in the region 24Q for storing processed data, it is also possible to transmit the MCU to be processed next to the region 24P for storing unprocessed data before transmitting the JMCU to the general-purpose memory 2.

The data transmission between the general-purpose memory and the data storage region and the access operation between the JPEG processing core and the data storage region are explained as above, and various modification examples are possible as described above.

In the actual JPEG process, a difference from the immediately previous MCU is taken as a DC component and starting from the front dot of the MCU, a difference between neighboring dots is found as an AC component and, therefore, the process requires the data of the front dot of the neighboring, immediately previous MCU, in addition to the data in the MCU. As to this, there are a plurality of acquisition methods.

The first one is a method in which necessary data is taken into the control section in JPEG processing section 25 during the period of storing data via the common bus controller 21, and the JPEG processing core that requires the information is notified of that actively or passively.

The second one is a method in which relevant data is stored in the data storage region 24 exclusively in a set with MCU and transmitted according to the direction of the JPEG processing core 27.

Another one is a method that resembles the second method, however, in which, when a plurality of MCUs are stored (physically) in one data storage region, both the MCU to be processed and the data itself of the previous MCU exist therein, rather than that they are exclusively stored in a set. Therefore, it is possible to easily realize by a method in which data is transmitted upon receipt of a direction and a plurality of methods for interfacing the data take-out direction can be thought similarly to addressing.

Next, the change of the operation clock frequency of the JPEG processing core is explained. As shown in FIG. 2, the JPEG processing section 14 in the present embodiment has the operation clock control section 22 and reduces the power consumption by changing the operation clock frequency in accordance with the operation state of the JPEG processing cores 27A to 27D. For example, when it is not necessary to perform the JPEG process at high speed, the operation clock frequency of the JPEG processing cores 27A to 27D is reduced. It is also possible to provide the operation clock control section 22 inside the control section in JPEG processing section 25.

Figure 23:
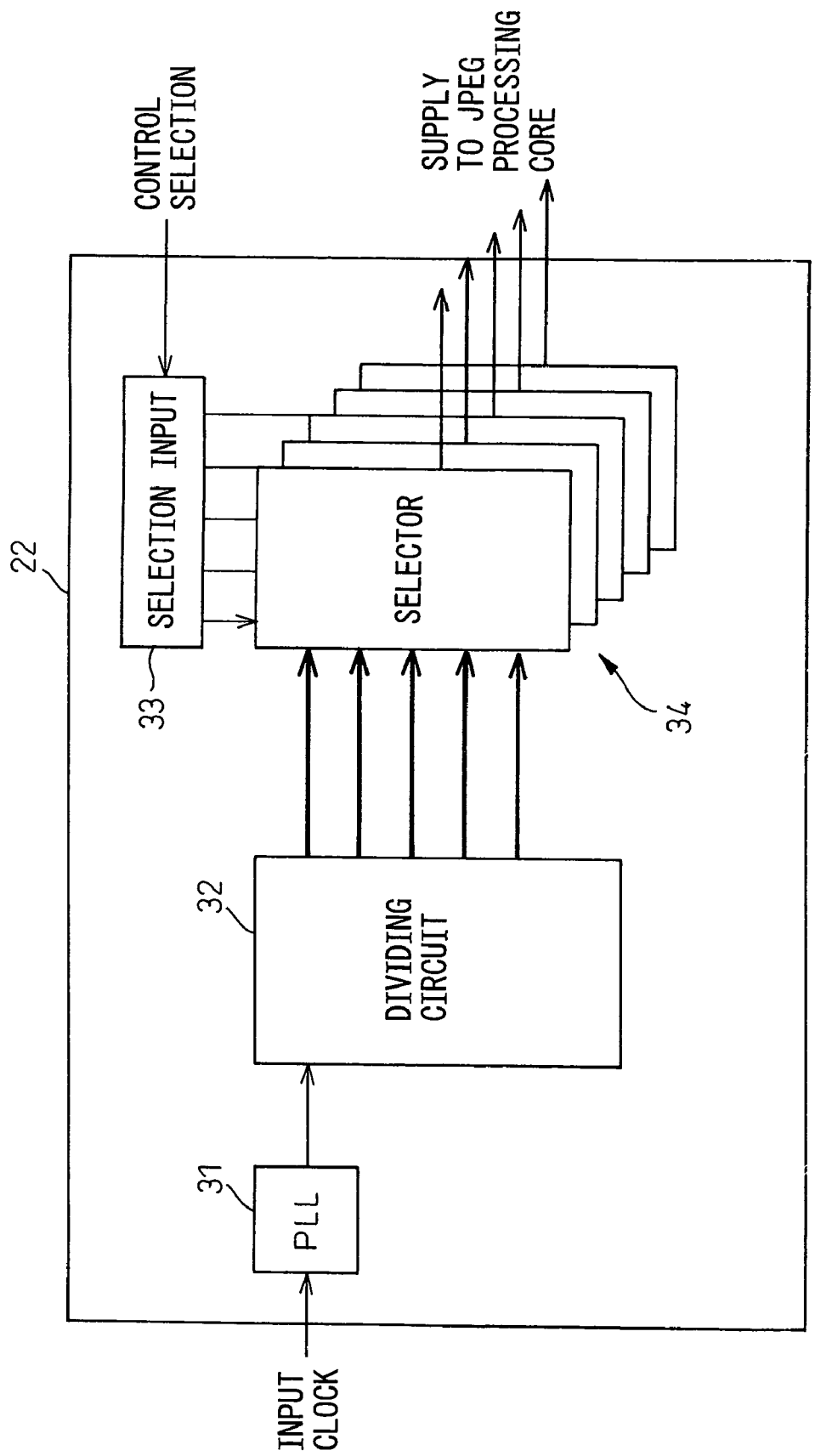
FIG. 23 is a diagram showing a configuration of an operation clock control section.

FIG. 23 shows the configuration of the operation clock control section 22. In general, the clock used inside the LSI is divided or etc. by a divider circuit 32 as the need arises after a higher frequency is generated from the source oscillation signal of an external input by using a PLL circuit 31 etc. In the present embodiment, a plurality of frequency patterns are prepared in advance in the divider circuit 32 and input to a selector 34 provided in correspondence with each of the JPEG processing cores. A selection input 33 controls to output a clock of which frequency from the selector 34 upon receipt of the operation mode pattern stored in the JPEG setting storage register 23. The clock of the frequency thus selected is supplied to each of the JPEG processing cores.

In an actual operation, if the operation frequency is reduced to ½, for example, the power consumption is reduced to ¼. Therefore, if, together with the control of the number of JPEG processing cores in operation, which will be described later, the operation clock frequency is reduced to ½ and the number of JPEG processing cores in operation is doubled, the performance remains the same and the total power consumption is reduced to ¼×2=½.

In addition, the time during which the common bus is occupied is reduced considerably and therefore it is possible to expect a reduction in power consumption due to the reduction in time during which the common bus is in a driven state.

The operation clock frequency of the JPEG processing core 27 does not relate to the data transmission to the data storage region 24 or to the data transmission from the data storage region 27, but is just related to the operation of the JPEG processing core 27. Therefore, in the case of the above-mentioned JPEG encoding process, the change of the operation frequency is performed when the encoding process being currently performed by all of the JPEG processing cores 27 is finished and the process of data in the next data storage region is started. The frequency change is not applied to the change performed before this switching timing.

Next, the data transmission when the frequency of the JPEG processing core is changed is explained.

At the portion where the frequency is changed, the frequency of the JPEG processing core 27 in the unit assigned to one of the JPEG processing cores 27 and the data storage region 24 is set in a set. Further, a control at a T-fold speed clock is taken for a certain frequency. The operation between the data storage region 24 and the common bus controller 21 is based on the system clock. Such a configuration is possible because the data storage region 24 is a dual port memory.

Here, a specific example for the frequency change as to the interface between the JPEG processing core 27 and the data storage region 24 is explained.

FIG. 24A and FIG. 24B are diagrams for explaining an example of the access system by the request/acknowledgment (Req & Ack) system; FIG. 24A shows signal paths and FIG. 24B shows the flow of signals.

This system is a method in which the JPEG processing core 27, which is very simple and at the leading position of access, makes a request (Req) for access and returns acknowledgment (Ack) when a state for accepting access is brought about. In this case also, the bus arbitration function of the second internal bus 28 is provided inside the control section in JPEG processing section 25.

In the JPEG processing section 14 in FIG. 2, the second internal bus 28 connects the data storage regions 24A to 24D and the JPEG processing cores 27A to 27D, and by this method in which the control section in JPEG processing section 25 manages the bus request of the second internal bus, any one of the method described above can be employed for the transmission method after the bus request is acquired. What is necessary is to identify the data storage region 24 on the side to be accessed and if only it is done, the frequency is the same for both the sides to make access and therefore, access can be made easily.

In FIG. 24A and FIG. 24B, the data storage region 24 that stores the MCU to be processed by the JPEG processing core having the bus request is notified of being accessed.

Figure 25B:
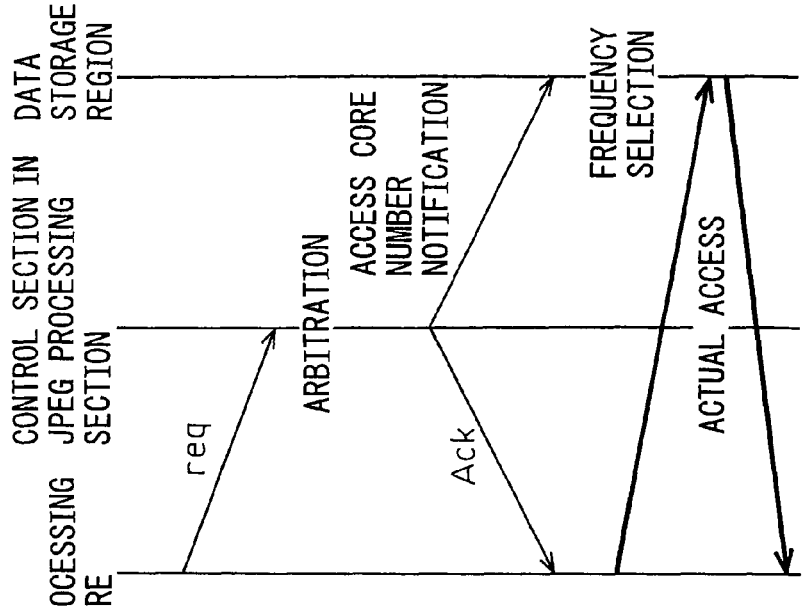
FIG. 25A and FIG. 25B are diagrams for explaining an access system by a request/permission system in a common data storage region.
Figure 25A:
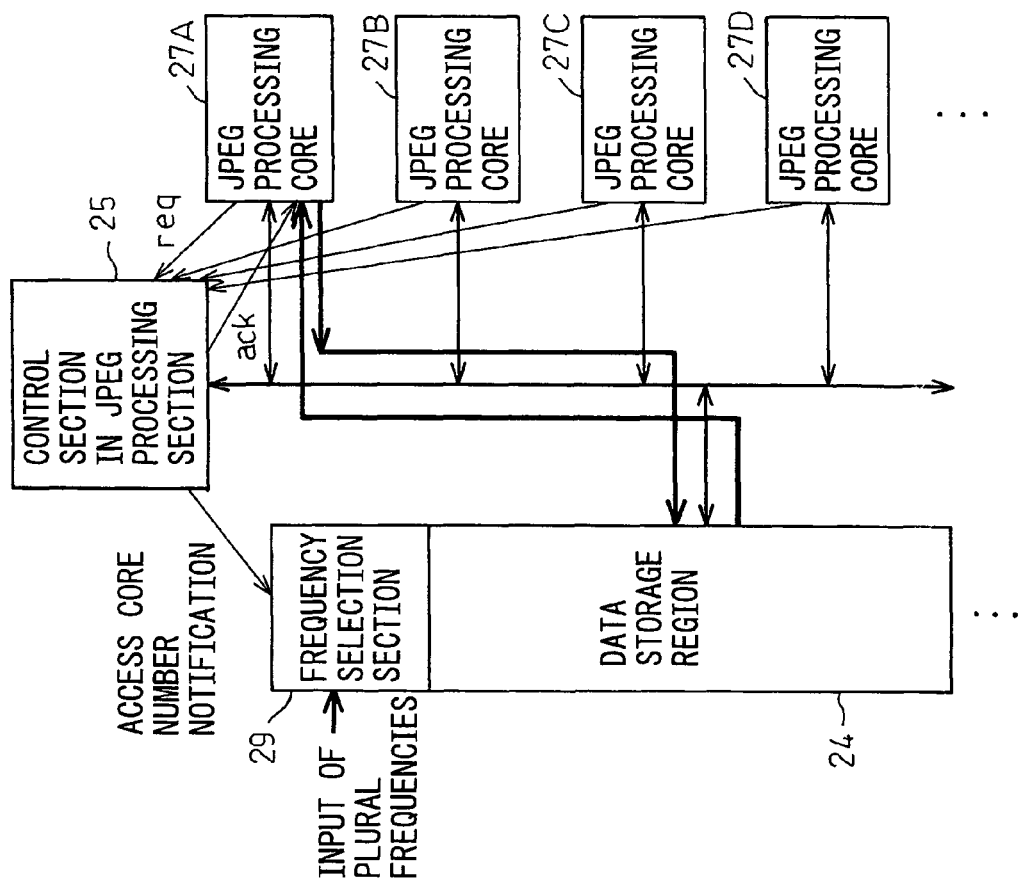

Further, even in the case where the plurality of data storage regions 24 exist in physically the same place and the interface portion with the JPEG processing core 27 is shared as shown in FIG. 19, the frequency can be identified by the JPEG processing core 27 having the bus request, therefore, if the frequency of the shared interface portion is changed, access can be made without problem. The operation in this case is shown in FIG. 25. The data storage region 24 is provided with a frequency selection section 29, which selects an operation clock of the corresponding frequency from the plurality of frequency inputs in accordance with the notification of the access core number from the control section in JPEG processing section 25, and the data storage region 24 operates at the selected operation clock.

Figures 26A, 26B, 26C:
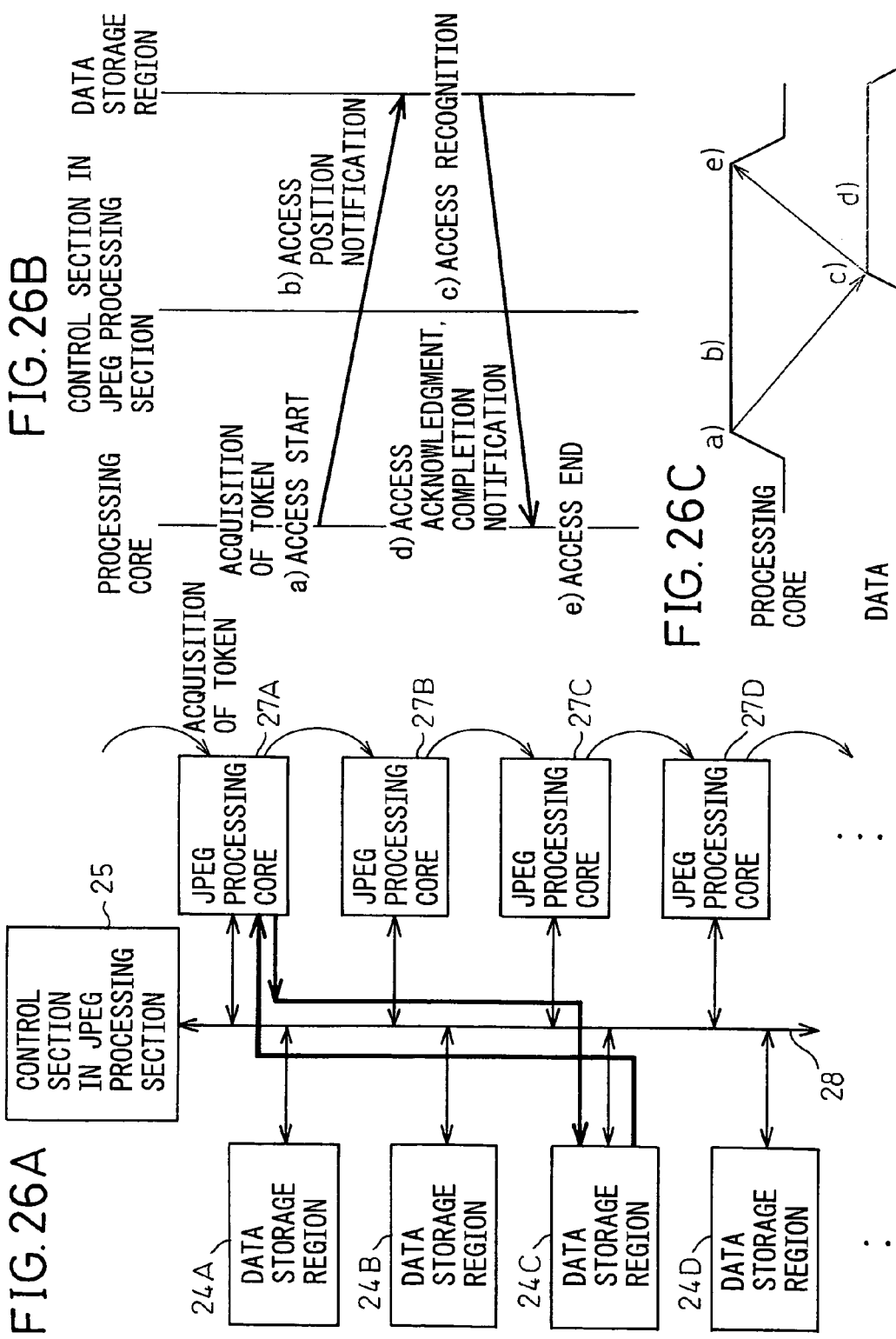
FIG. 26A to 26C are diagrams for explaining access by a token system.

FIG. 26A to FIG. 26C are diagrams for explaining an example of the access system by the token system; FIG. 26A shows signal paths, FIG. 26B shows the flow of signals, and FIG. 26C shows a time chart.

As shown in FIG. 26A, in the access system by the token system, a token is circulated between the JPEG processing cores 27A to 27D and at the time when the JPEG processing core trying to make access has the token, access is started and after access is completed, the token is delivered to the next JPEG processing core, as shown in FIG. 26B and FIG. 26C. At this time, the acquisition of the token is notified to the control section in JPEG processing section 25 and the JPEG processing core that tries to make access can be known, therefore, as in FIG. 24A and FIG. 24B, notification is given to the data storage region to be accessed and access is made. Here, the access is made at T times the operation clock frequency and therefore, an asynchronous access method is employed for exchange and in response to the address output and access request by the regulation of length capable of recognizing any frequency without fail, access operation recognition, read data output, and write completion are performed.

Figure 27:
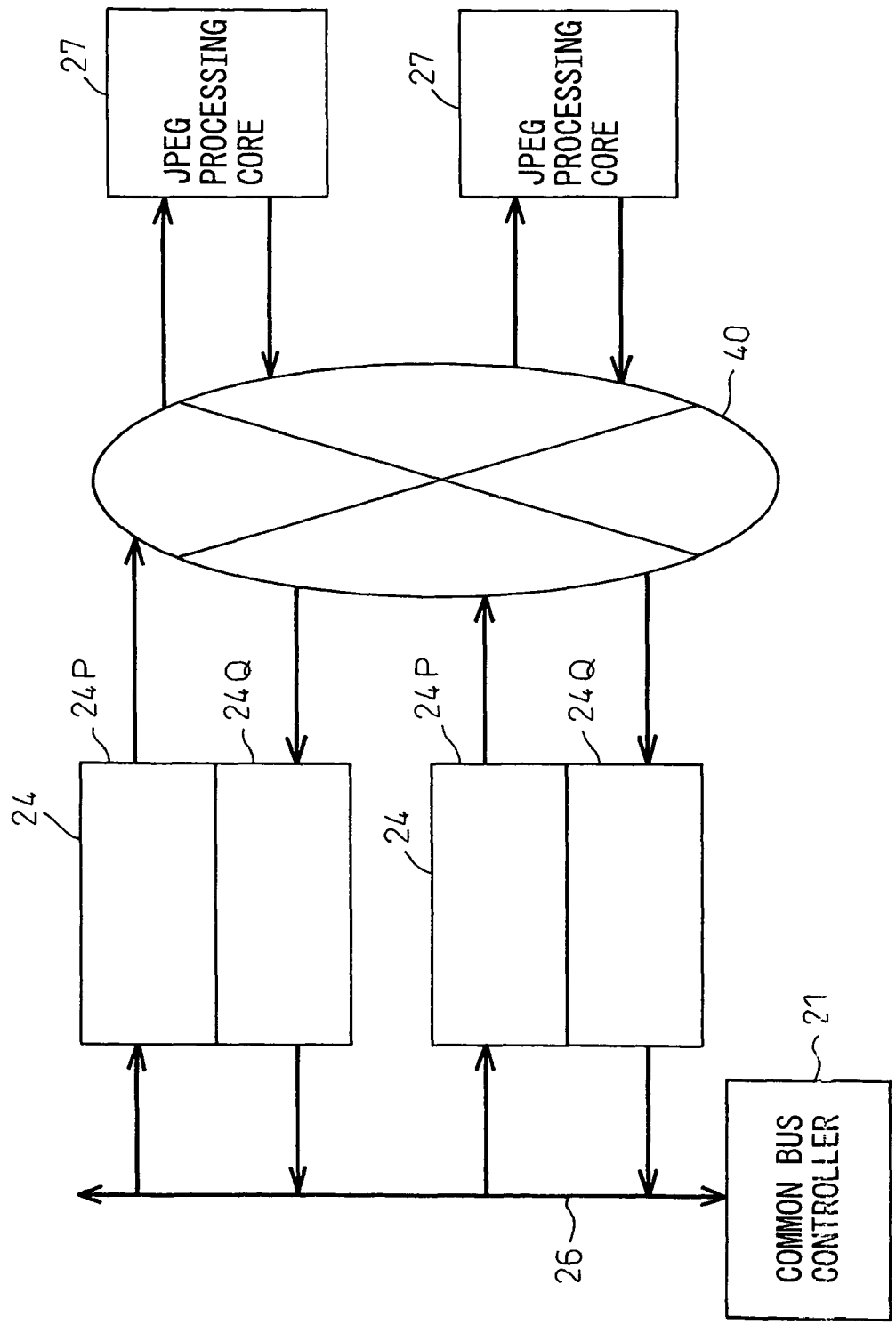
FIG. 27 is a diagram for explaining a connection system by a switch/matrix structure.

FIG. 27 is a diagram showing the configuration of a connection system by a switch matrix structure, which is another access system.

In this system, a switch matrix 40 controls all the connections between the data storage region 24 and the JPEG processing core 27 and they are theoretically in direct connection. By the way, as to the configuration of the switch itself in the switch matrix 40, a switch of a general shared memory type, a switch of crossbar type, or another switch configuration can be used.

The access method most suited to the switch matrix system among the access methods explained as above is the packet method shown in FIG. 18.

FIG. 28A to FIG. 28D are diagrams showing examples of packets in the switch matrix system.

FIG. 28A shows a packet of the read command from the JPEG processing core 27 to the data storage region 24. The destination address indicates the location (address) in the data storage region 24 at which the data to be read is stored. The source address indicates the number of the JPEG processing core making access. The command indicates that how many bytes from the read start position indicated by the address are transmitted. The trailer is for judging whether the packet is correct, and added in accordance with the total number of packet bytes such as CRC, checksum, and protocol.

FIG. 28B shows a packet of the write command from the JPEG processing core 27 to the data storage region 24. The destination address indicates the location (address) in the data storage region 24 at which the data to be written is stored. The source address, the command, and the trailer are the same as those in FIG. 28A. The data indicates the data to be written actually.

FIG. 28C shows a write acknowledge packet from the data storage region 24 to the JPEG processing core 27. The destination address indicates the data storage region 24 to which access is made. The source address indicates the number of the JPEG processing core that has made access. The command is acknowledge to the write command and if necessary, indicates what is written. For example, it indicates how many bytes from the write start position indicated by the address are written. The trailer is for judging whether the packet is correct, and added in accordance with the total number of packet bytes such as CRC, checksum, and protocol.

FIG. 28D shows a read acknowledge packet from the data storage region 24 to the JPEG processing core 27. The destination address, the source address, the command, the data, and the trailer are the same as those in FIG. 28(B) except in that it is an acknowledge for the read command. The trailer is for judging whether the packet is correct, and is added in accordance with the total number of packet bytes such as CRC, checksum, and protocol.

Next, the dynamic change of the number of JPEG processing cores 27A to 27D and the data storage regions 24A to 24D in operation is explained. This will terminate the operation of the JPEG processing cores 27A to 27D and the data storage regions 24A to 24D that are not required to operate to reduce power consumption.

The dynamic state change of the JPEG processing cores 27A to 27D and the data storage regions 24A to 24D is performed when the JPEG processing core ends the encoding process, as in the case of the frequency change. When the number of JPEG processing cores used for the process is reduced, operation is performed by reducing the number of JPEG processing cores used at the time of parallelization of the encoding process of the data in the next data storage region. When the number of JPEG processing cores is increased, transmission of the data to be assigned in the data storage region is not performed and therefore, if there is a space in the data storage region, data transmission is performed in advance to realize a process in a form with as small loss as possible.

The storage regions are reduced or increased in number in the same manner, however, when the data storage regions are reduced in number, at the time when the image data having been taken in advance by now or the data after the encoding process is processed, the data storage region is newly set as an unused region. Conversely, when only the data storage region is added, the transmission in advance of the image data is performed in order to use the data storage region effectively.

Next, the JPEG decoding process is explained.

Figure 29:
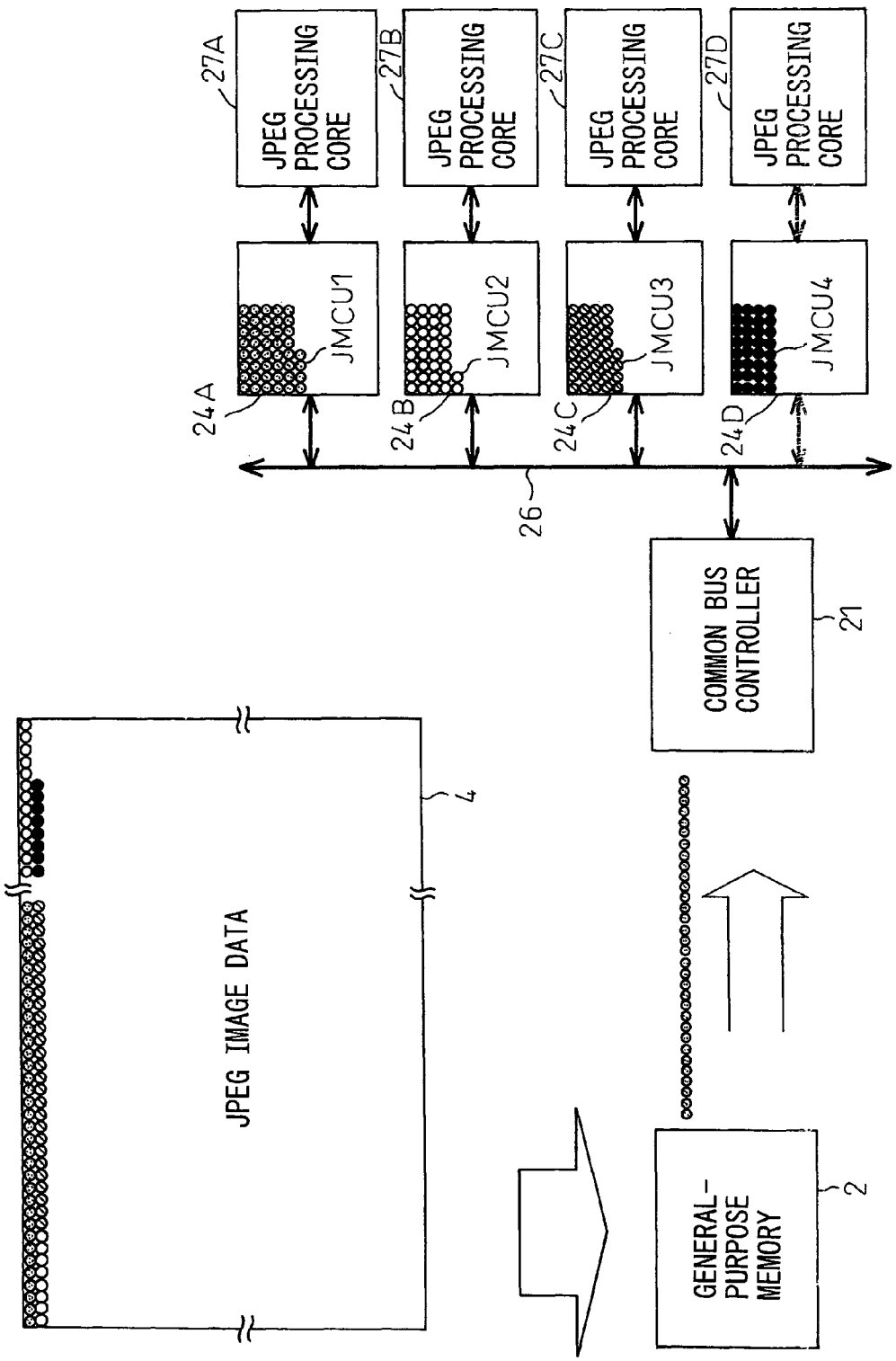
FIG. 29 is a diagram for explaining data transmission from a general-purpose memory to a data storage region during the period of JPEG decoding process.

FIG. 29 shows how data transmission is performed from the common memory to the data storage region at the time of the JPEG decoding process and FIG. 30 shows how data transmission is performed from the data storage region to the common memory at the time of the JPEG decoding process, both corresponding to FIG. 13 and FIG. 14 at the time of encoding, respectively.

As shown in FIG. 29, at the time of the JPEG decoding process, the data in units to be processed in each of the JPEG processing cores, for example, the JMCU corresponding to the MCU, is transmitted to the unprocessed data storage region in the data storage region corresponding to each of the JPEG processing cores from the JPEG image data 4 stored in the general-purpose memory 2 via the common bus controller 21. For example, the JMCU to be processed in the JPEG processing core 27A is transmitted to the unprocessed data storage region in the corresponding data storage region 24A.

As shown in FIG. 30, the MCU of the image data processed and decoded in each of the JPEG processing cores is stored in the processed data storage region in the data storage region. The stored MCU is transmitted from the processed data storage region in the data storage region 24A to the general-purpose memory 2 via the common bus controller 21.

As described above, the data transmission at the time of the JPEG decoding process is the same except in that the direction of transmission is opposite and the unprocessed data storage region in the data storage region is replaced with the processed data storage region.

In the flow of the decoding process in FIG. 11, as to the process before the decoding of the MCU in step S27, the control section in JPEG processing section 25 analyzes the data and executes processes specified by the data. As to the decoding process of the MCU in step S27, in order to perform parallel processing as well as encoding, first the JPEG processing core with the smallest number performs the Huffman decoding process to find a break in the MCU and when a break in the MCU is found, the next JPEG processing core sequentially performs the Huffman decoding process to find a break in the MCU in the same manner. Then subsequent decoding process is independent and therefore, each of the JPEG processing cores performs the decoding process in parallel. The image data obtained by the decoding process is stored temporarily in the processed data storage region in the data storage region and, for example, is written into the general-purpose memory 2 by burst transmission when the process for four MCUs is completed. Normally, the burst transmission has a discrete address system as the data take-in in encoding and therefore an enormous total time is required for the transmission process, however, it is possible to perform data transmission efficiently by performing burst transmission.

Next, as to a control register necessary for performing the JPEG control, which is provided in the JPEG setting storage register 23, the meaning and detail of the respective registers are explained in order.

FIG. 31 is a diagram showing the configuration of the JPEG control register in the present embodiment. As shown schematically, 16 registers are provided and each register has a configuration constituted by 16 of the JPEG processing core and 32 of the data storage region, and the number of bits etc. is set such that up to two of the encoding process and the decoding process can be performed simultaneously at three patterns of operation frequency. However, the present invention is not limited to this.

Figures 32A, 32B:
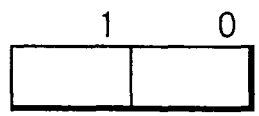
FIG. 32A and FIG. 32B are diagrams showing a configuration of an operation mode register.

FIG. 32A and FIG. 32B show the configuration of the operation mode register. The operation mode register sets the operation of the JPEG processing core. As the basic operations of the JPEG process include encoding and decoding, and which one is to be executed, and which process is performed by which of the JPEG processing cores, are set. In addition, the setting of the frequency of the JPEG processing core that performs each process is also performed by the present register. All of the JPEG processing cores and the data storage regions are equivalent and therefore, it is possible to perform the setting of the number of JPEG processing cores, the number of data storage regions, and the frequency to be assigned to each process, and the setting of the frequency to be assigned to those not in operation.

The registers in FIG. 32A are provided, the number of which corresponding to the number of encoding processes and decoding processes, and the JPEG processing core and the data storage region to be assigned to each process are defined. In FIG. 32B, whether or not each process is performed (terminated) and the operation clock frequency are set, two bits are assigned to each process, and termination is set by "00", and the frequency is set by "01", "10", and "11".

Figure 33A:
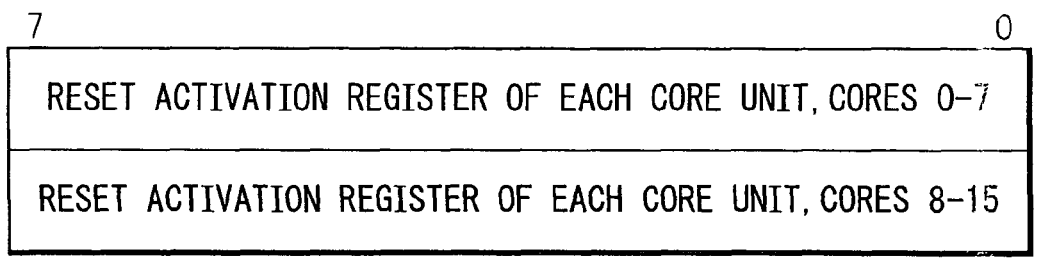
FIGS. 33A to 33C are diagrams showing a configuration of a command register.
Figure 33B:
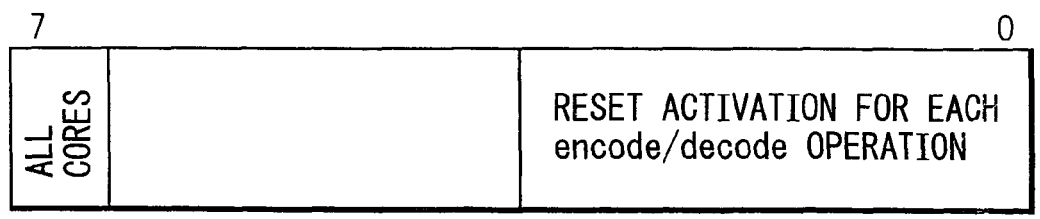
Figure 33C:
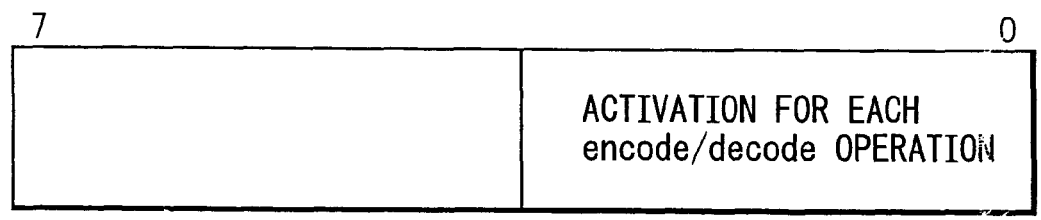

FIG. 33A to FIG. 33C show the configuration of the command register and each bit in FIG. 33A performs a reset execution direction of each of the JPEG processing cores, the portion in FIG. 33B performs a reset execution direction of the encoding process and the decoding process, respectively, and a reset execution direction of all of the cores, and the portion in FIG. 33C performs an activation direction of the encoding process and the decoding process, respectively.

Figure 34:
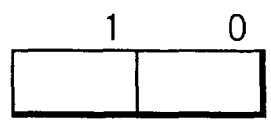
FIG. 34 is a diagram showing a configuration of an operation state display register.

FIG. 34 shows the configuration of the operation state display register, and two bits are assigned to each of the JPEG processing cores, and "00" indicates the non-operation state, "01", resetting/trouble occurring, "10", encoding processing, and "11", decoding processing.

FIG. 35 shows the configuration of the image longitudinal/transverse size register. This register is provided for each of the encoding process and the decoding process, showing the longitudinal/transverse size of the image to be encoded or the image to be decoded. At the time of encoding, this register is read to recognize the size of the image to be subjected to the encoding process and, at the time of decoding, the result of decoding is written into this register.

FIG. 36A and FIG. 36B show the configuration of the interrupt state/mask register, showing the current interrupt state and mask state. FIG. 36A shows the interrupt state that indicates that the encoding process and the decoding process are completed normally, and the abnormal interrupt state in which an abnormal event has occurred during processing. In FIG. 36B, each one bit indicates the masked state of the process.

FIG. 37A and FIG. 37B show the configuration of the error interrupt state detail/mask register, and FIG. 37A and FIG. 37B respectively show the 4×8 bit configuration, respectively, wherein each bit corresponds to a process, showing four kinds of error factors and masked states along with the fault states and masked states. The main error factors include the following:

Reset is executed during operation and the operation is terminated halfway

Bus error during the period of take-in of encoding/decoding data

Error that has occurred during the period of analysis of compressed data (JPEG header process)

Error that has occurred during the period of Huffman encoding process in decompression Buffer overflow Timer time-out during the period of encoding/decoding process, etc.

Figure 38A:
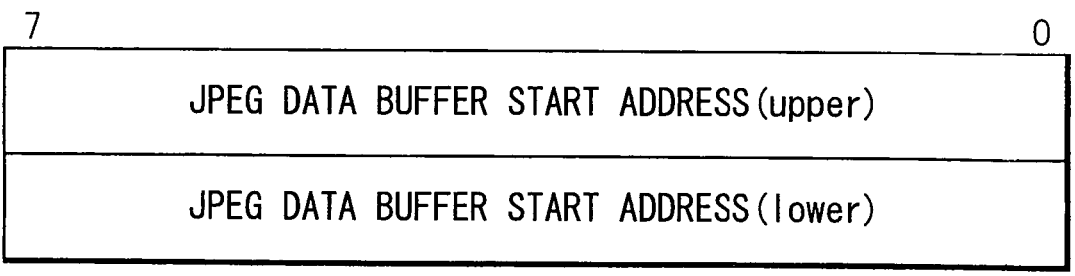
FIG. 38A and FIG. 38B are diagrams showing a configuration of a data buffer start address register.
Figure 38B:
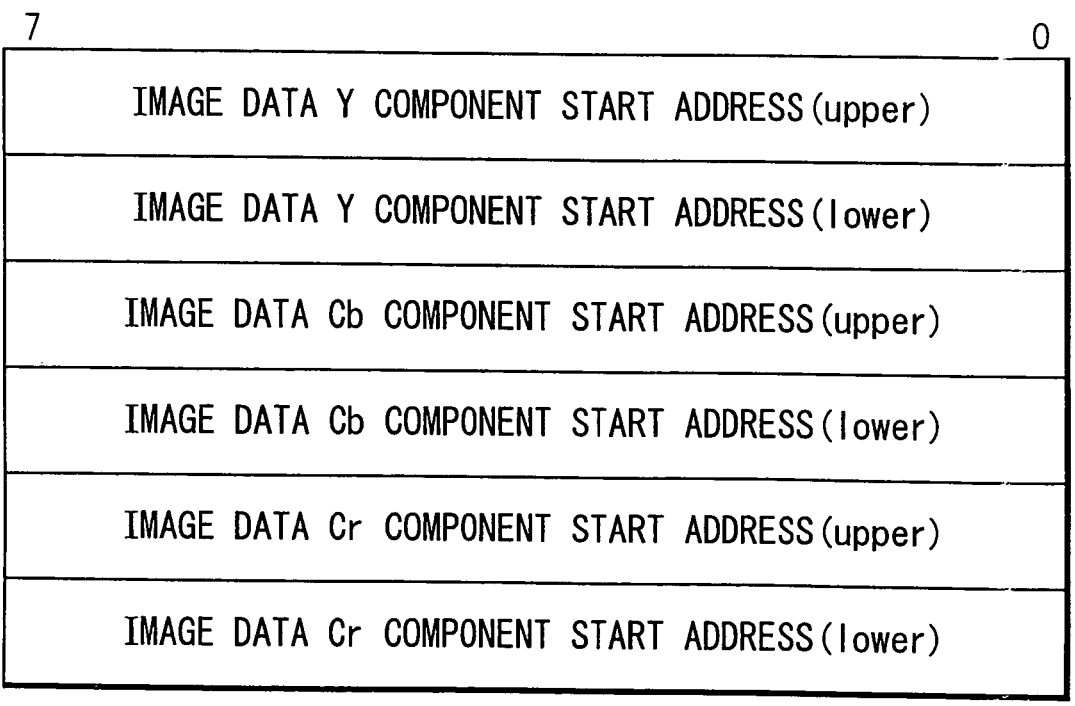

FIG. 38A and FIG. 38B show the configuration of the data buffer start address register. This register is provided for each of the encoding/decoding process. FIG. 38A shows the start address of JPEG data and, at the time of decoding, this register is read to recognize the start address of the JPEG data to be subjected to the decoding process, and at the time of encoding, the encoding result (converted data) is written from the start register of the register. FIG. 38B shows the start address of each component and, at the time of encoding, this register is read to recognize the start address of each component of the image data to be subjected to the encoding process and at the time of decoding, the decoding result is written from the start address of the register.

FIG. 39 shows the configuration of a JPEG data size register. This register reports the amount of the JPEG data having been subjected to the encoding process in a realtime manner. The registers are provided in a number corresponding to that of encoding processes that can be performed simultaneously.

FIG. 40A and FIG. 40B show the configuration of the trouble monitor timer/core number notification register, which is provided for each of the encoding/decoding process. FIG. 40A shows the timer for monitoring the occurrence of trouble and FIG. 40B shows the number of the JPEG processing core in which the trouble has first occurred.

When one encoding/decoding process is performed by a plurality of the JPEG processing cores, the plurality of the JPEG processing cores are activated substantially at the same time. However, as the processing size is small at the present time, it is unlikely that the processing times differ considerably and it can be expected that all of the processes performed simultaneously are finished with time differences equal to or less than a fixed period of time. Because of this, if the operation of the JPEG processing core performing the next process does not end even after a lapse of a time set in the trouble monitor timer, rather than the operation end time of the JPEG processing core performing the immediately previous process, it is regarded as a trouble and trouble notification is done. When all of the bits are zero, monitoring is not performed. The operation after the trouble notification depends on the setting of the in-trouble action register.

At the portion in FIG. 40B, when a trouble occurs, the occurrence bit turns to "1" and, at the same time, the number of the JPEG processing core in which the trouble has occurred is written and notified. When "0" is written into the occurrence bit, it is cleared along with the number of the JPEG processing core. When a time-out occurs simultaneously in a plurality of JPEG processing cores, the number of the JPEG processing core in which a time-out has occurred first is indicated.

Figure 41:
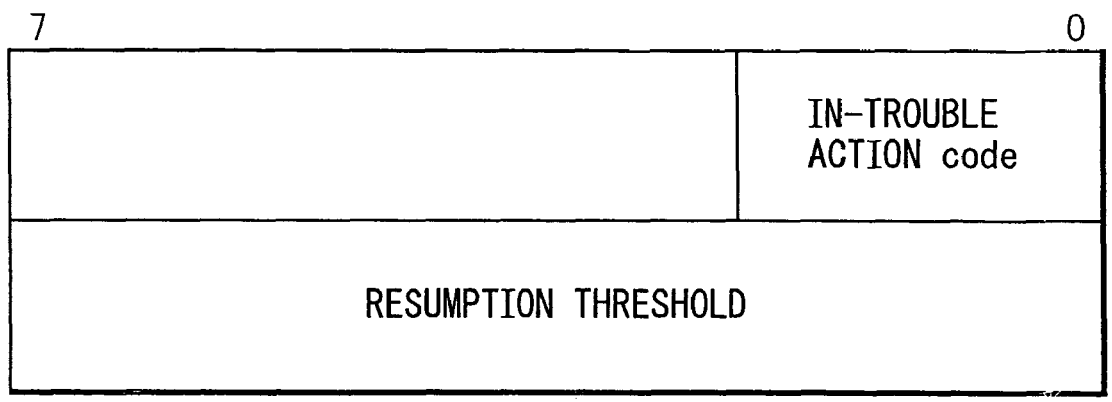
FIG. 41 a diagram showing a configuration of an in-trouble action register.

FIG. 41 shows the configuration of the in-trouble action register, which is provided for each encoding/decoding process. This register defines which process is to be performed when the above-described time-out trouble occurs. In the example shown schematically, the following actions are taken depending on the set values.

"000": No action

"001": Automatic assigning of operation to the JPEG processing cores not in use

The JPEG processing core in which trouble has occurred is terminated and the operation is assigned to the JPEG processing core not in use currently. When there is no JPEG processing core to which the operation is to be assigned, the JPEG processing core in trouble is operationally separated (disabled).

"010": Automatic resumption

Self-reset is performed and the operation is resumed again. However, there is a possibility that the resumption may be infinite and therefore, resumption is repeated until the number of times of the resumption threshold value of the register is reached and after that, the JPEG processing core in trouble is separated.

"011" Separation of trouble

The JPEG processing core in trouble is separated. The process being performed by the JPEG processing core in trouble is executed continuously by another JPEG processing core.

"100": The entire operation is completely stopped

Besides above, in order to use a register other than those in the specification document of which the quantization table or the Huffman table is described, it may also be possible to provide a register having an internal buffer to use the buffer by inputting a value therein, or to specify the operations for replacing the table with one determined by specifications, etc.

Next, the flow of an actual operation in which specific values are set in the register as mentioned above and operation is performed is explained.

It is assumed that vales are set in the register under the following conditions and the JPEG encoding process is performed.

Operation mode: the number of assigned JPEG processing cores=4, the number of data storage regions=8, assigned to the encoding process A, and the frequency is in pattern 0, Interrupt: ending interrupt and abnormal interrupt all released, the error factor detail mask also all released Image longitudinal/transverse size: 1,600×1,200

Trouble monitor timer: 1,000 CLK

Action in trouble: automatic assignment to the JPEG processing core not in use

| Buffer start address: | 0x10000000 |
|---|---|
| Image data address: Y | 0x20000000 |
| | Cb 0x30000000 |
| | Cr 0x40000000 |

After performing these settings, the operation of the encoding process A is activated by the command register. After activation, with regard to the SOI, frame header, quantization table, Huffman table, etc., stored before the encoded data of the actual MCU of the JPEG file, those, such as the set contents and the contents described in specifications, to be used in the actual encoding process are subjected to the process by the control section in JPEG process section 25, and described at the buffer start address of the JPEG data.

In order to perform steps S5, S6, and S12 shown in FIG. 10, which are the processes for actually encoding data, addresses are calculated based on the image data address and the data is stored in the data storage region. In the setting shown as an example, the eight data storage regions are reserved and therefore, the data corresponding to the eight MCUs from the front address is transmitted first to the data storage region by burst access. In the conventional system, since transmission is performed in units of MCUs, the addresses are switched considerably for each column and therefore data transmission efficiency is very poor, as shown at the lower side in FIG. 9, however, the eight MCUs are transmitted in a group and, therefore, it is possible to transmit eight times the data in one row by burst access as shown at the upper side in FIG. 9. After the transmission of the data corresponding to eight columns is completed, the process in step S5 is started.

Figure 42:
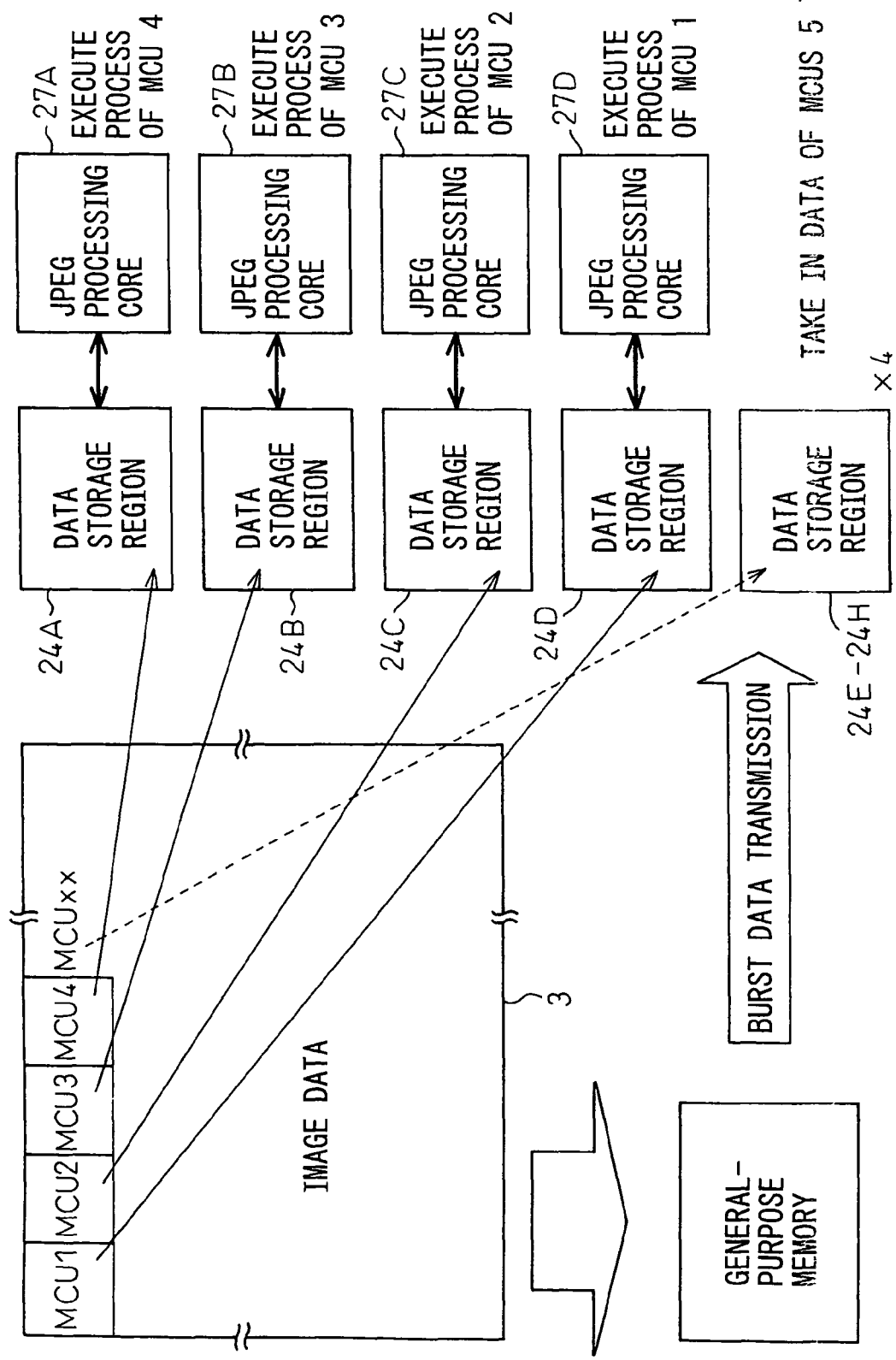
FIG. 42 is a diagram for explaining parallel processing of a plurality of MCUs.

FIG. 42 shows how the data transmission and the assignment of the JPEG processing core and the data storage region are performed. In the actual operation in step S5, with regard to the DC component, the difference from the DC component in the neighboring block is recorded, however, the data to be subjected to parallel processing is taken in previously as mentioned above and the difference from the neighboring DC component is known, and therefore, the respective JPEG processing cores perform the process in parallel in units of MCUs. When finishing the JPEG encoding process in units of MCUs, the respective JPEG processing cores temporarily write the encoded data into the data storage region. The JPEG encoded data is more compressed than the original image data and it can be expected that its size is reduced considerably and therefore, the efficiency is improved when transmission is performed in units of a certain amount as explained regarding the operation of the SDRAM.

Further, the operation of the respective JPEG processing cores is started substantially at the same time and finished simultaneously and therefore, in this example, the JPEG encoded data is burst-transmitted in a lump when the four MCUs are processed. Furthermore, the MCU data for the respective JPEG processing cores that perform the next process has already been acquired and therefore, it is possible to take in the next data corresponding to four MCUs in the data storage region in which the processed MCU data is stored after writing data, as well as performing the JPEG encoding process continuously. In other words, in addition to the parallel processing, the data transmission is perfectly overlapped to the JPEG encoding process time of the JPEG processing core and therefore, the process can be further increased in speed.

Next, a case is considered, where a certain JPEG processing core has caused a time-out error to occur. The operation is explained on the assumption that the automatic assignment in trouble and trouble notification are set, the JPEG processing cores 27A to 27D are assigned originally, and an abnormal event has occurred in the JPEG processing core during the period of process of MCU 1 to MCU4 in the example.

When a time-out occurs in the JPEG processing core 27C, trouble information is written into the register and an interrupt occurs. From the time-out detail display, it is known that in which JPEG processing core a time-out has occurred.

Further, with regard to the operation state of the JPEG processing core, it is known that the JPEG processing core 27E has been newly assigned from the operation state display register. The assigned JPEG processing core 27E performs the encoding process which was to have been performed by the JPEG processing core 27C and at the stage where the JPEG encoding is completed, data transmission to the common buffer is performed as in the normal operation.

In the case of the automatic resumption of the action register, it is made possible to cause a self-reset to occur, when in trouble, for recovery until the resumption threshold value is reached or the operation becomes a normal operation.

In the case where separation of a trouble is specified, instead of assigning a new JPEG processing core or performing self-recovery work by reset, after the trouble is notified, the JPEG processing core 27A having finished the process is made to perform the process of the JPEG processing core 27C and, at the state where the process is completed, data transmission to the common buffer is performed as in the normal operation and at the same time, the subsequent operation is performed by the three JPEG processing cores.

When the entire operation is completely stopped, in the parallel processing when the trouble occurs, even if there is JPEG encoding data for which the process has been completed, the transmission thereof is not performed. In order to resume these processes the next time, after causing reset to occur in the JPEG processing core used in the encoding process, the process is performed from the initial setting again.

The above-mentioned JPEG processing core 27C in trouble is brought into the reset state the instant that the trouble occurs, whichever action has been selected, and it is not possible to assign the encoding/decoding process unless the reset is released.

Next, the operation when a time-out occurs in the JPEG processing core will be explained. When a time-out occurs in the JPEG processing core, another JPEG processing core is assigned in the example and, therefore, as in the encoding process and when, for example, the JPEG processing core 27C runs into trouble, the JPEG processing core 27E is newly assigned to take over the operation of the JPEG processing core 27C. As explained above, when the process has advanced to the point at which a break of the MCU is known, the operation of the JPEG processing core currently processing another MCU is completed earlier, however, the data transmission to the common buffer is not performed until the operation of the JPEG processing core 27E is completed.

When the actions are the automatic recovery, separation, and entire operation stop, the operations are the same as those in the encoding process and the above-described assignment of another JPEG processing core.

Next, the detail of the time-out process is explained.

Figure 43:
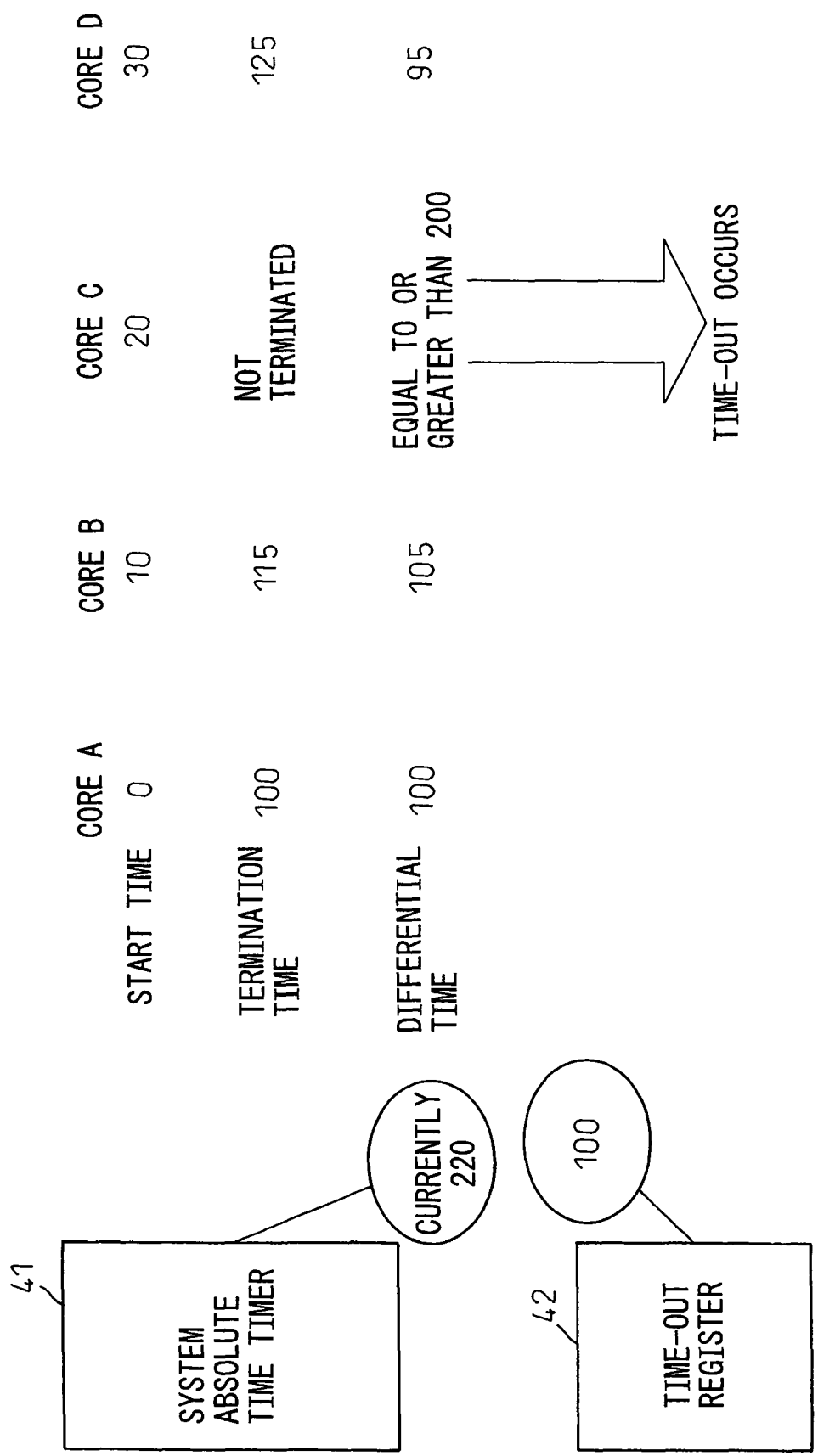
FIG. 43 is a diagram for explaining a time-out detection process.

FIG. 43 is a diagram for explaining the time-out detection process. As shown in FIG. 43, in the present invention, there exists a timer 41, that indicates the absolute time of the system, which monitors and stores the process start time and the process end time of the respective JPEG processing cores. The state in which the condition of time-out is satisfied is a state in which the process is not completed, after the processing time of the JPEG processing core performing the immediately previous process+the time-out time (the time set in a time-out register setting register 42) elapse, from the process start time of each of the JPEG processing cores.

In other words, with the method of the present invention, in which the processing time of each of the JPEG processing core is inferred from the absolute time of the system, and even when a time-out actually occurs, the time taken for the process by the JPEG processing core performing the immediately previous process is reserved until a new process is performed and, therefore, it is possible to accurately set a time of the time-out for the processing time, which should be taken normally, obviating the need to set a time of the time-out while taking into consideration the processing time during the period of normal operation due to a change in frequency.

Further, from the above-mentioned processing time, the amount of processing is detected and it is possible to easily estimate the time required for the encoding/decoding process to be performed.

The method for transmitting data, the method for monitoring trouble, and the method for recovering from trouble explained in the embodiments are only examples and there may be methods other than the JPEG processing method described above.

The present invention can be applied to any JPEG image processing circuit.

What is claimed is:
1. A JPEG image processing circuit comprising:
a common bus connected to an image memory; and
a JPEG processing section that is connected to the common bus, processes unprocessed data obtained from the image memory via the common bus in the JPEG format, and outputs processed data to the image memory via the common bus, wherein:
the JPEG processing section comprises a plurality of JPEG processing cores and a plurality of data storage regions provided in correspondence with the plurality of the JPEG processing cores; and when each of the JPEG processing cores performs the process, the part of the unprocessed data required for the process of each of the JPEG processing cores is stored in each of the data storage regions corresponding to each of the JPEG processing cores.

2. The JPEG image processing circuit as set forth in claim 1, wherein the processed data in each of the JPEG processing cores is output to the image memory via the common bus after being stored in the corresponding data storage region.

3. The JPEG image processing circuit as set forth in claim 1, wherein the amount of unprocessed data to be stored in each of the data storage regions can be set arbitrarily.

4. The JPEG image processing circuit as set forth in claim 1, wherein the amount of unprocessed data to be stored in each of the data storage regions can be varied dynamically.

5. The JPEG image processing circuit as set forth in claim 1, wherein the amount of unprocessed data to be stored in each of the data storage regions is the minimum encoding unit (MCU) of the JPEG process.

6. The JPEG image processing circuit as set forth in claim 1, wherein:
   the JPEG processing section comprises a control section; and
   the control section changes the use method of the plurality of JPEG processing cores in accordance with the operation mode.

7. The JPEG image processing circuit as set forth in claim 1, wherein:
   the JPEG processing section comprises a control section; and
   the control section dynamically changes the number of JPEG processing cores in operation from among the plurality of JPEG processing cores.

8. The JPEG image processing circuit as set forth in claim 1, wherein the JPEG processing section comprises an operation clock control section that sets the operation clock frequency of each of the JPEG processing cores in accordance with the operation.

9. The JPEG image processing circuit as set forth in claim 8, wherein the operation clock control section dynamically varies the operation clock frequency of each of the JPEG processing cores.

10. The JPEG image processing circuit as set forth in claim 1, wherein:
    the JPEG processing section comprises a control section; and
    the control section automatically detects the occurrence of trouble in the plurality of the JPEG processing cores and indicates the trouble that has occurred.

11. The JPEG image processing circuit as set forth in claim 10, wherein the control section assigns the process of the JPEG processing core in which the trouble has occurred to another JPEG processing core to continue the process based on the trouble indication.

12. The JPEG image processing circuit as set forth in claim 11, wherein:
    the control section monitors the processing time in each of the JPEG processing cores and detects the occurrence of trouble by judging that a time-out of the processing time has exceeded a reference time; and
    the time-out judgment is performed by detecting the elapsed time after the process starts by the absolute time timer of the JPEG processing core and comparing the elapsed time with the reference time.

13. The JPEG image processing circuit as set forth in claim 12, wherein the control section changes the reference time when the process is started again after the time-out has occurred.

* * * * *